(12) United States Patent
Nishida

(10) Patent No.: US 10,966,555 B2
(45) Date of Patent: Apr. 6, 2021

(54) DRINKING DRAMATIZATION GLASS AND REMOTE TOAST COUNTER SYSTEM

(71) Applicant: NETAPPLI CO., LTD., Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 0 days.

(21) Appl. No.: 16/976,450

(22) PCT Filed: May 13, 2019

(86) PCT No.: PCT/JP2019/019008
§ 371 (c)(1),
(2) Date: Aug. 27, 2020

(87) PCT Pub. No.: WO2019/221085
PCT Pub. Date: Nov. 21, 2019

(65) Prior Publication Data
US 2021/0000274 A1  Jan. 7, 2021

(30) Foreign Application Priority Data

May 15, 2018  (JP) .............................. JP2018-093429

(51) Int. Cl.
*A47G 23/16*  (2006.01)
*B65D 25/02*  (2006.01)
(Continued)

(52) U.S. Cl.
CPC ......... *A47G 23/16* (2013.01); *A47G 19/2227* (2013.01); *B65D 25/02* (2013.01);
(Continued)

(58) Field of Classification Search
None
See application file for complete search history.

(56) References Cited

U.S. PATENT DOCUMENTS 3,646,471 A * 2/1972 DeMent ................. H01S 3/093
372/77
8,550,288 B2  10/2013 Briar et al.
(Continued)

FOREIGN PATENT DOCUMENTS

JP  S6292769 U  6/1987
JP  H10181970 U  6/1989
(Continued)

OTHER PUBLICATIONS

International Search Report (ISR) dated Jun. 11, 2019, issued for International application No. PCT/JP2019/019008. (2 pages).

*Primary Examiner* — Chico A Foxx
(74) *Attorney, Agent, or Firm* — Law Office of Katsuhiro Arai

(57) ABSTRACT

A drinking dramatization glass 1 includes: a glass body 10; a storage part 20 placed inside the glass body for storing a communication device 100 having an image display part 101; and a transparent part 12 through which to view, from the exterior, images displayed on the image display part; wherein a dielectric substance 32 capable of letting radio waves pass through is filled inside the storage part, and a first radio-wave transmission surface formed on a side face of the glass body and a second radio-wave transmission surface formed on a side face of the storage part are placed at a close-enough distance from each other for letting radio waves pass therethrough when a drink is present between them, wherein the storage part manifests, when its periphery is surrounded by the drink, a waveguiding function of letting radio waves pass through the interior thereof.

15 Claims, 19 Drawing Sheets

(51) Int. Cl.
*A47G 19/22* (2006.01)
*G08B 5/22* (2006.01)
*H04N 5/38* (2006.01)
*H04N 5/232* (2006.01)

(52) U.S. Cl.
CPC ............... *G08B 5/22* (2013.01); *H04N 5/232* (2013.01); *H04N 5/38* (2013.01); *A47G 2019/2238* (2013.01); *A47G 2019/2244* (2013.01); *B65D 2203/10* (2013.01); *B65D 2203/12* (2013.01)

(56) References Cited

U.S. PATENT DOCUMENTS

| | | | | |
|---|---|---|---|---|
| 9,162,630 | B2* | 10/2015 | Pluta | B60R 11/02 |
| 2005/0237685 | A1* | 10/2005 | Miyata | H04R 17/00 |
| | | | | 361/91.1 |
| 2007/0204495 | A1* | 9/2007 | Lee | G09F 23/08 |
| | | | | 40/324 |
| 2008/0100469 | A1 | 5/2008 | Goldburt | |
| 2010/0045705 | A1* | 2/2010 | Vertegaal | G06F 3/0482 |
| | | | | 345/661 |
| 2014/0197128 | A1* | 7/2014 | Stempel | A47G 19/2227 |
| | | | | 215/374 |
| 2014/0313176 | A1* | 10/2014 | Kim | G09G 3/3225 |
| | | | | 345/211 |
| 2014/0372045 | A1* | 12/2014 | Keski-Pukkila | A61B 5/6887 |
| | | | | 702/19 |
| 2015/0182797 | A1* | 7/2015 | Wernow | A61B 5/6887 |
| | | | | 434/247 |
| 2015/0335183 | A1 | 11/2015 | Balachandran et al. | |
| 2016/0030967 | A1 | 2/2016 | Ayer et al. | |
| 2016/0291327 | A1* | 10/2016 | Kim | G06F 3/167 |
| 2016/0334332 | A1* | 11/2016 | Magnussen | G01N 21/474 |
| 2018/0072553 | A1* | 3/2018 | Lyons | A47J 31/525 |
| 2018/0132643 | A1* | 5/2018 | Shklar | A47G 23/16 |
| 2019/0004762 | A1* | 1/2019 | Yoshimura | G06F 16/587 |
| 2020/0199507 | A1* | 6/2020 | Okon | C12M 23/10 |
| 2020/0209051 | A1* | 7/2020 | Trivedi | G01G 19/40 |

FOREIGN PATENT DOCUMENTS

| | | |
|---|---|---|
| JP | H10345213 A | 2/1991 |
| JP | H10666452 U | 9/1994 |
| JP | 3086140 U | 6/2002 |
| JP | 2005099159 A | 4/2005 |
| JP | 2012532804 A | 12/2012 |
| JP | 2016002451 A | 1/2016 |
| WO | 2011005318 A2 | 1/2011 |

* cited by examiner

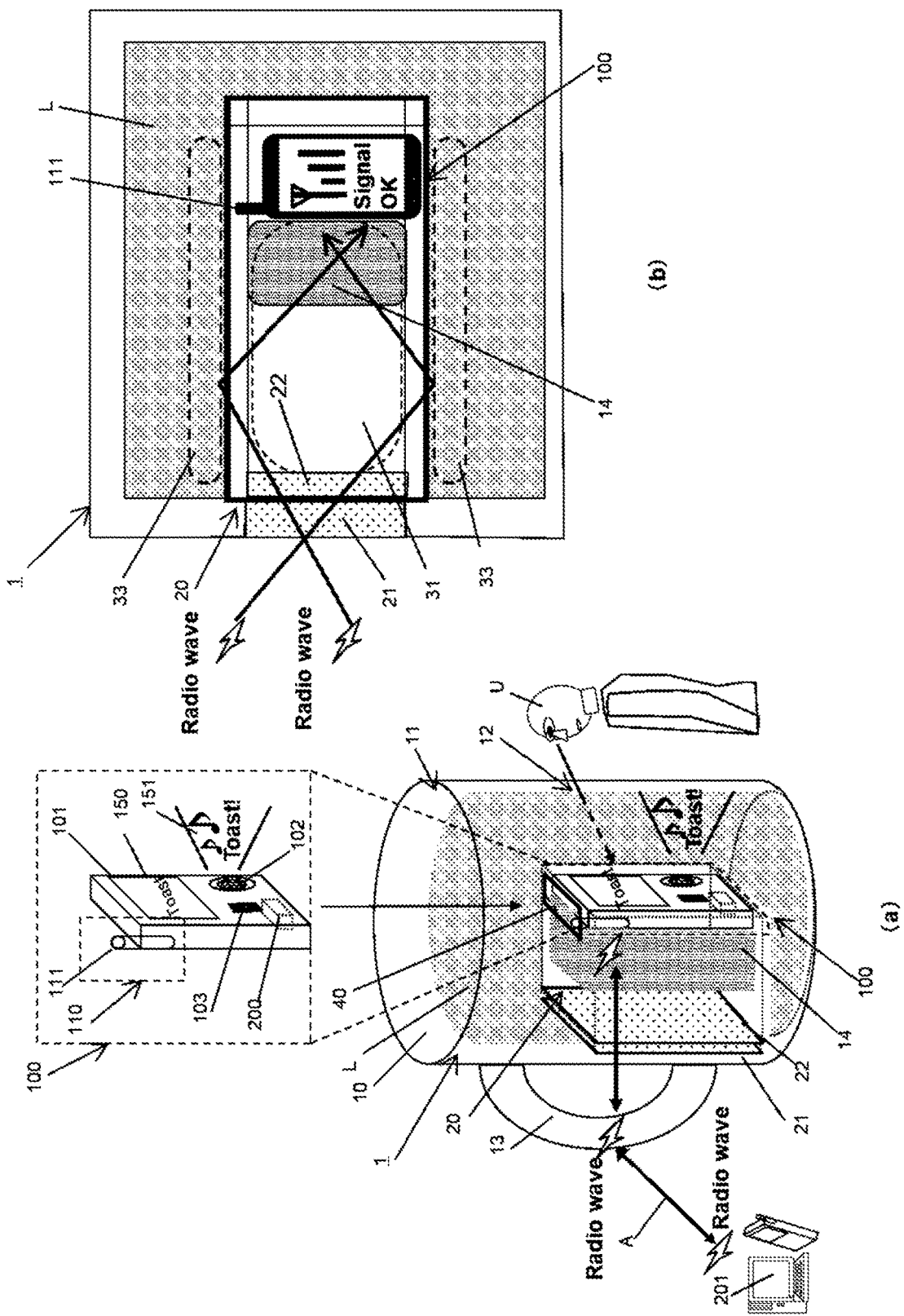
[FIG. 1]

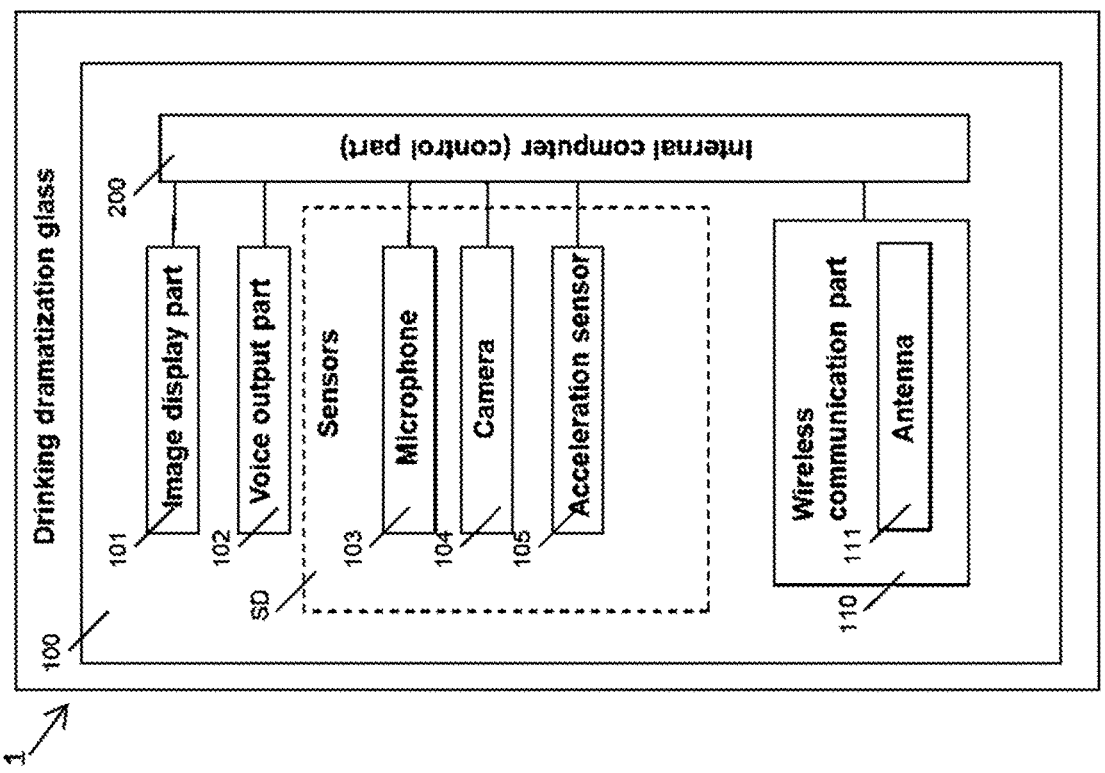
[FIG. 2]

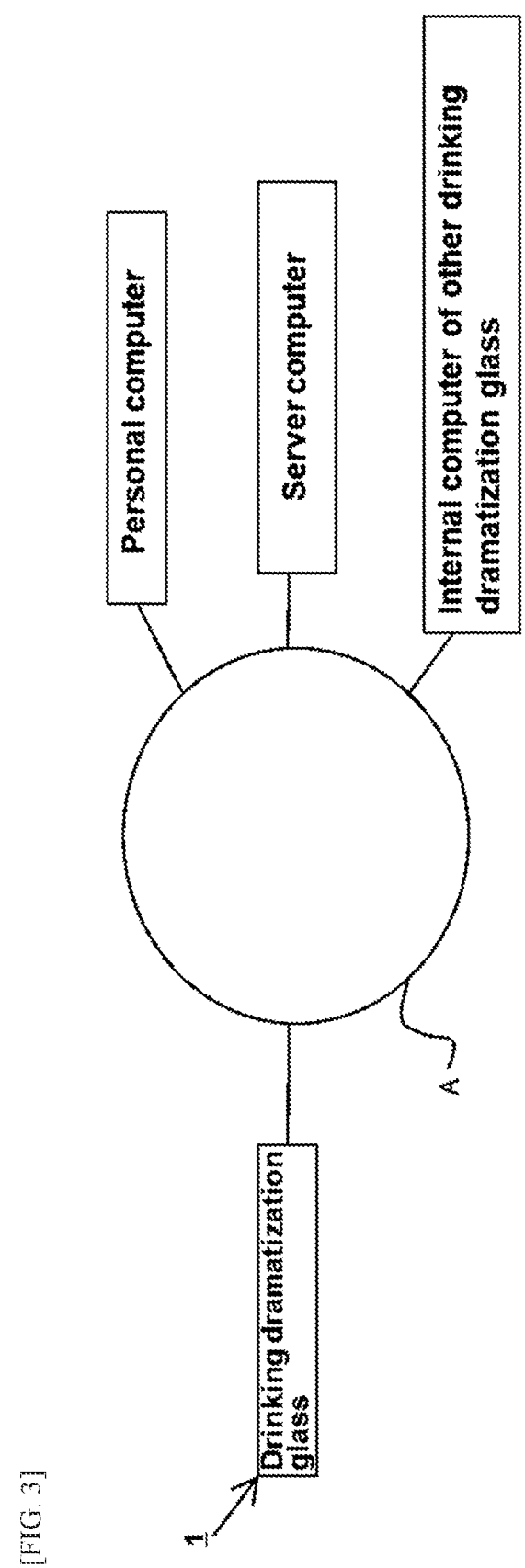
[FIG. 3]

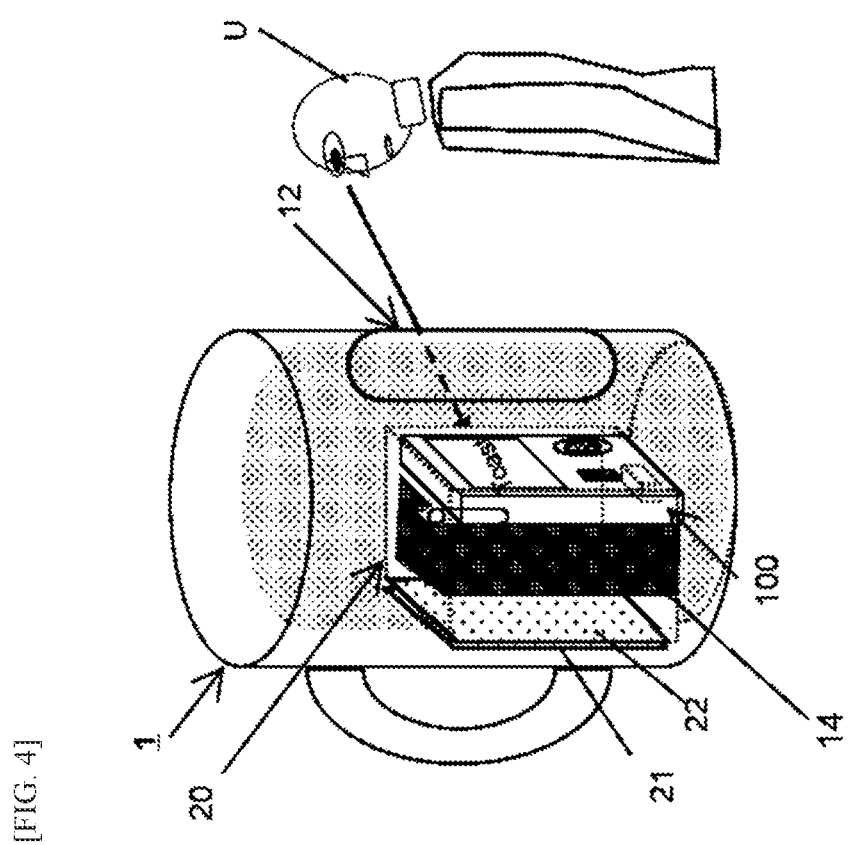
[FIG. 4]

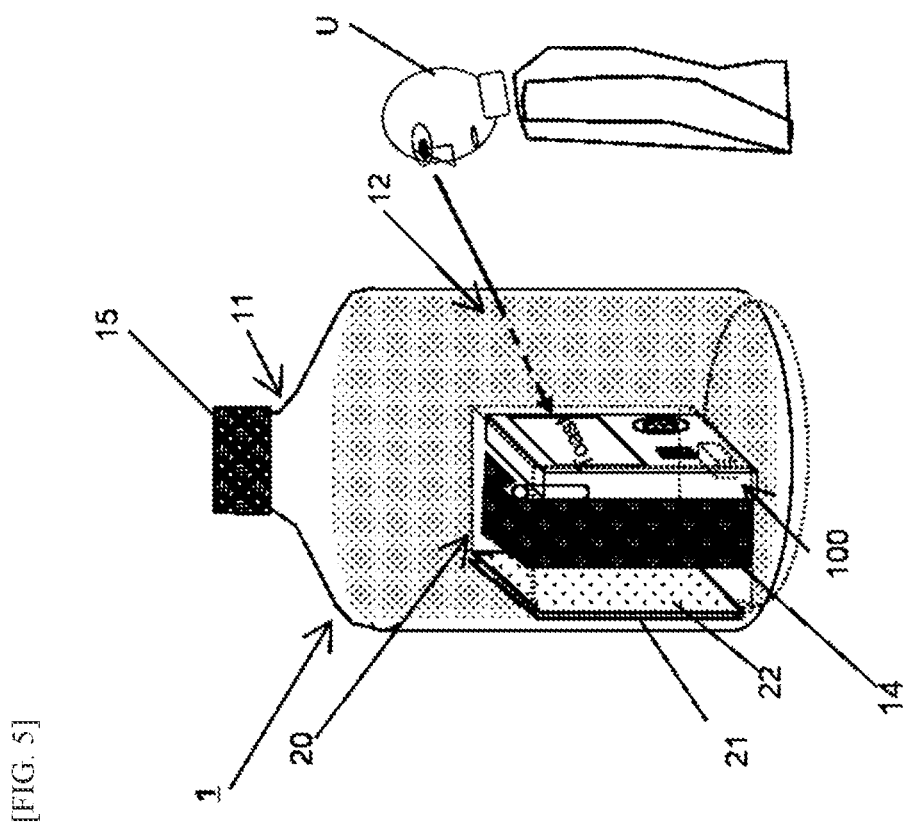
[FIG. 5]

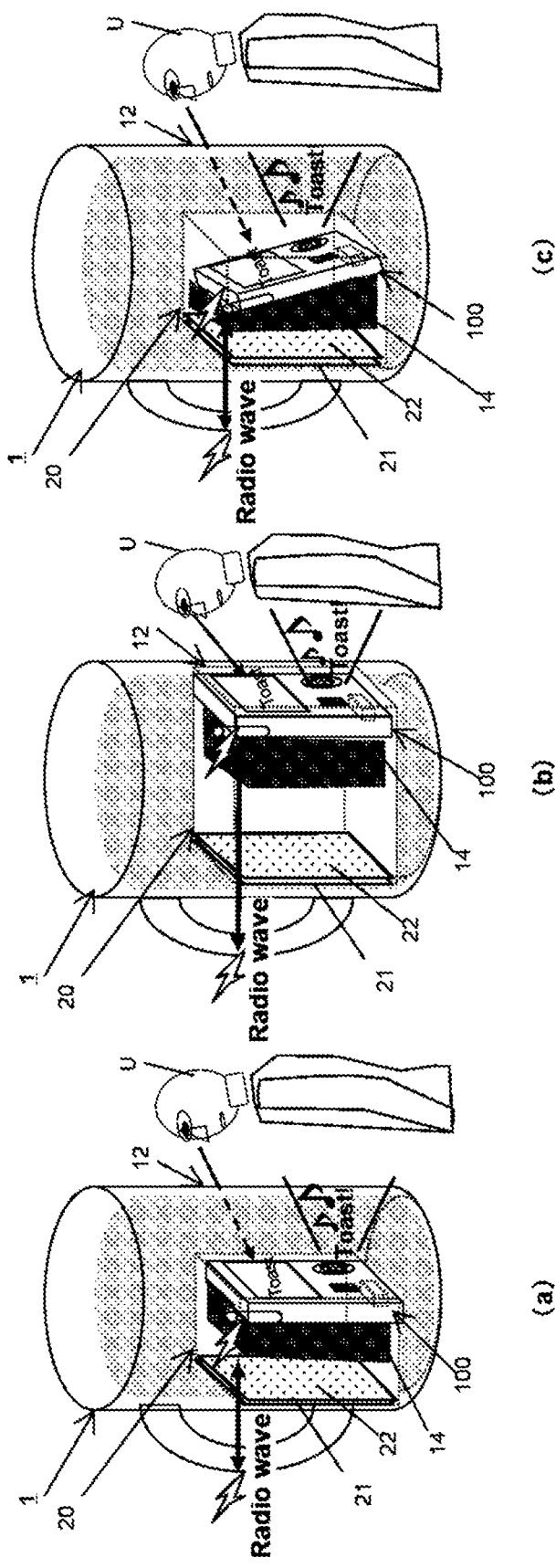
[FIG. 6]

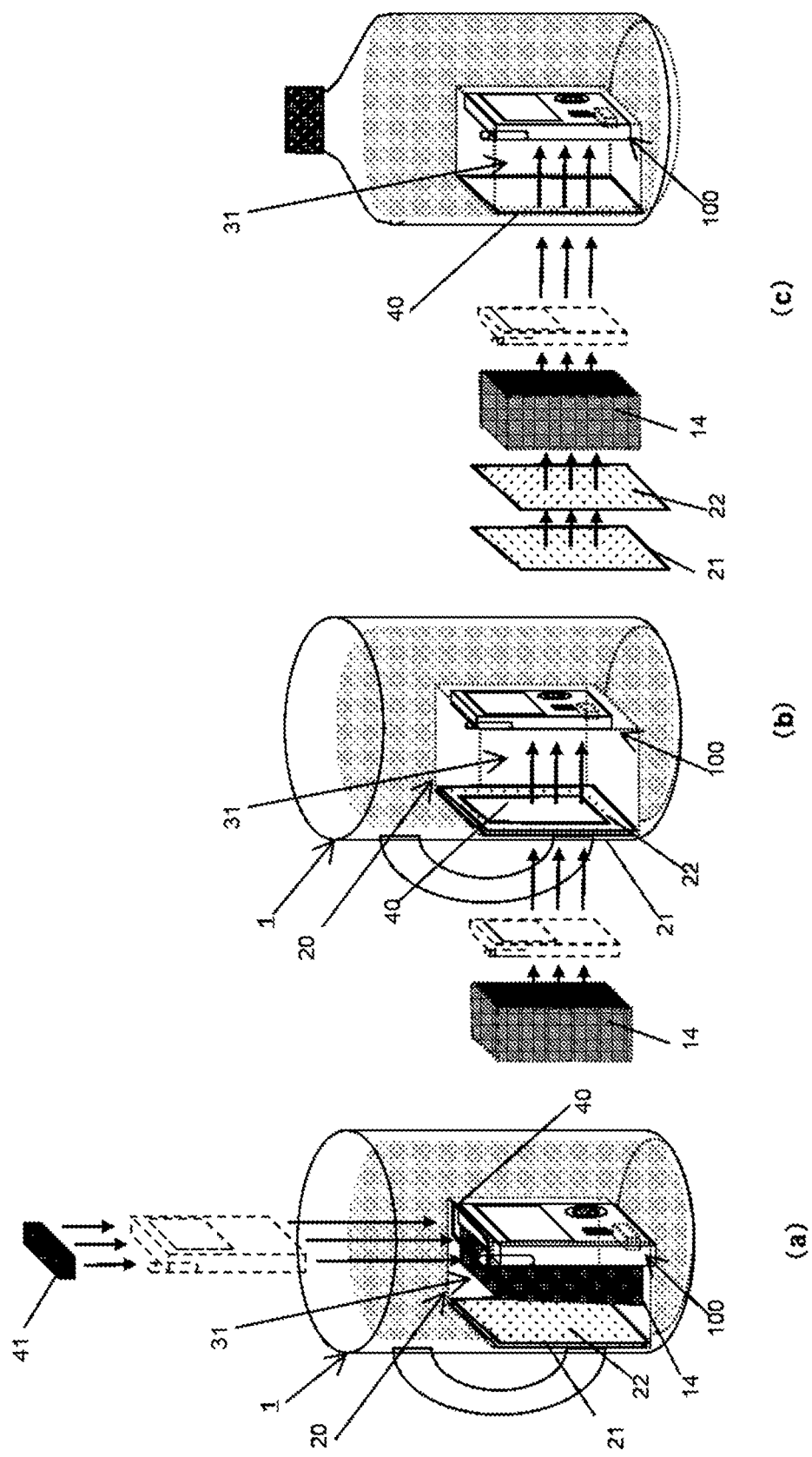

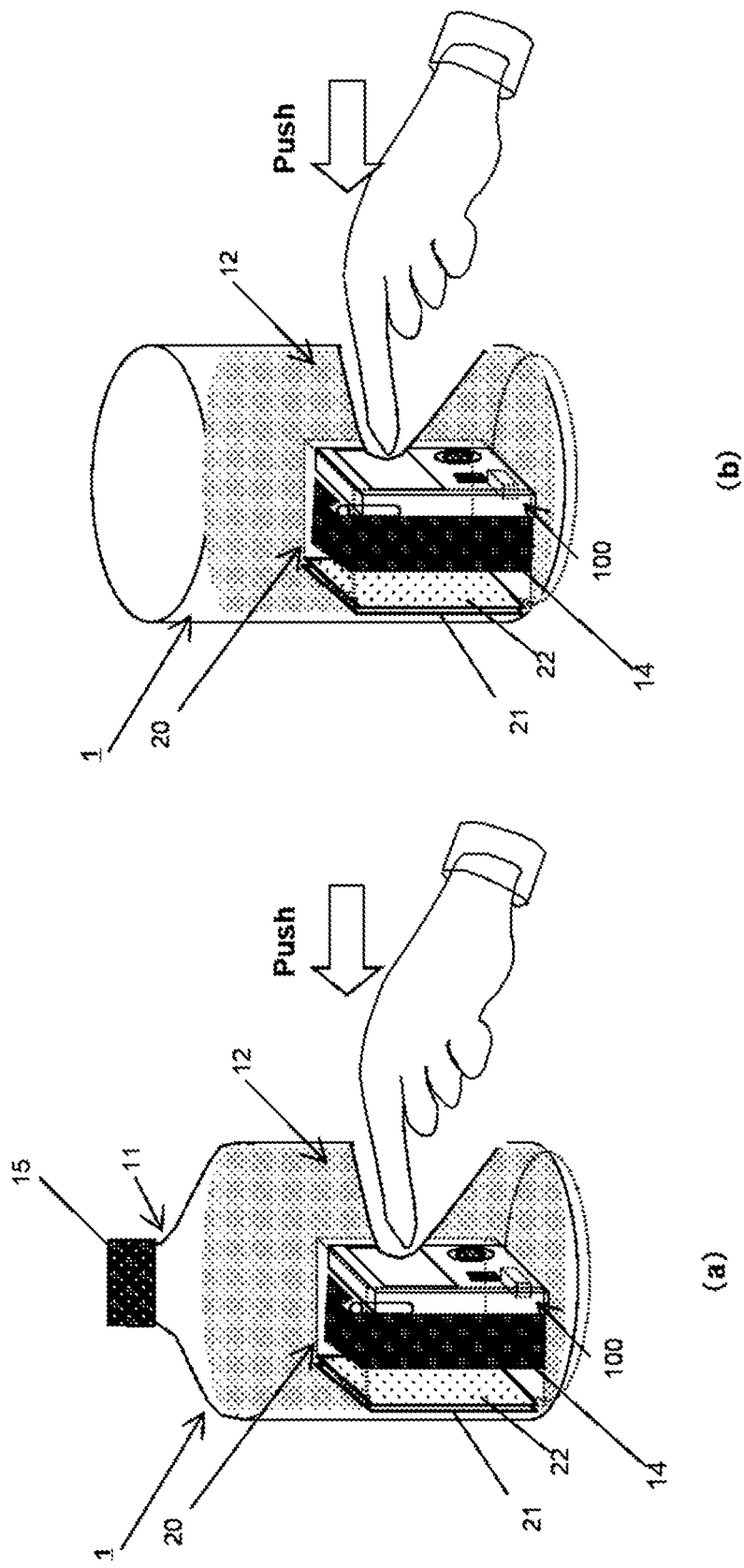

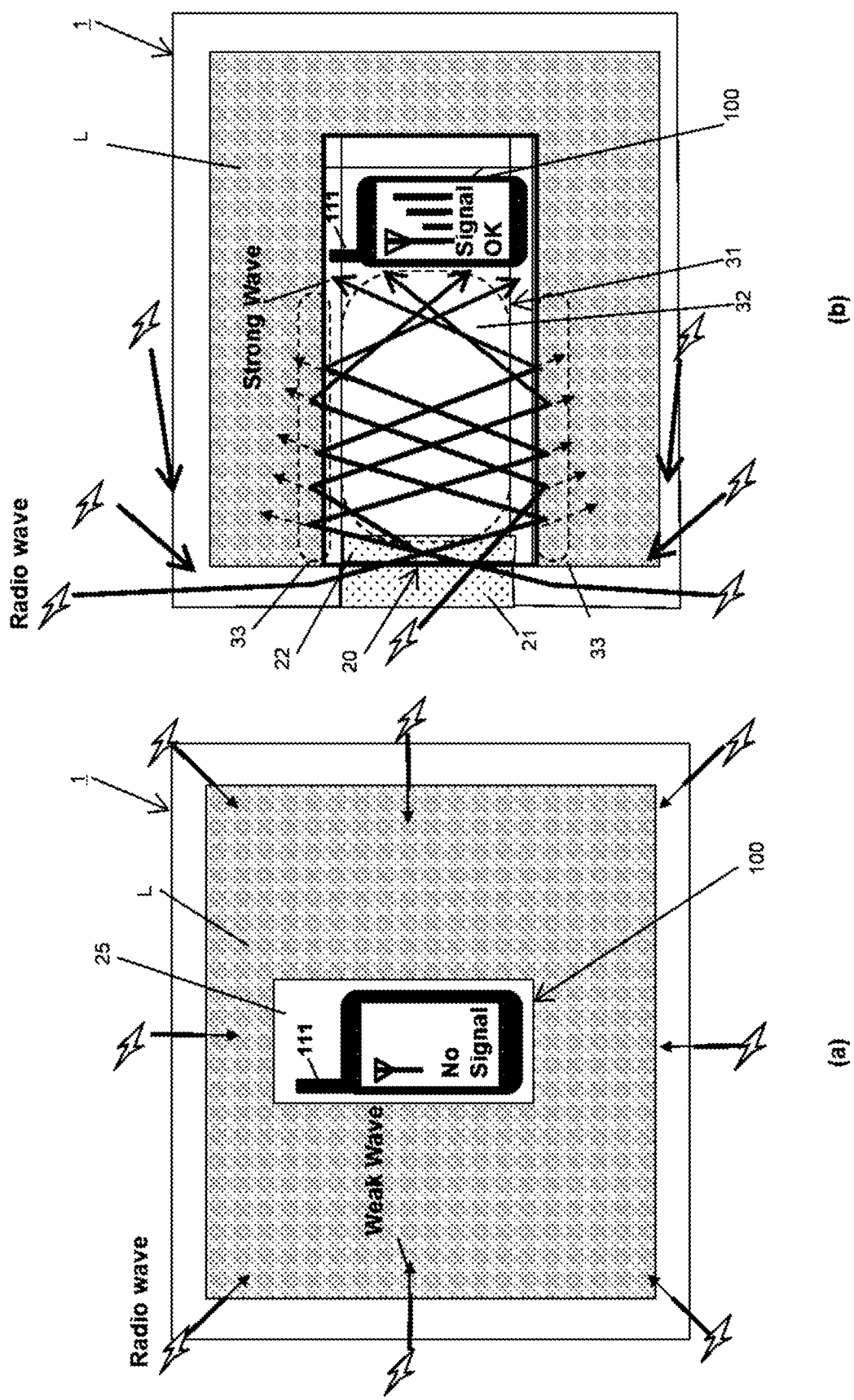
[FIG. 9]

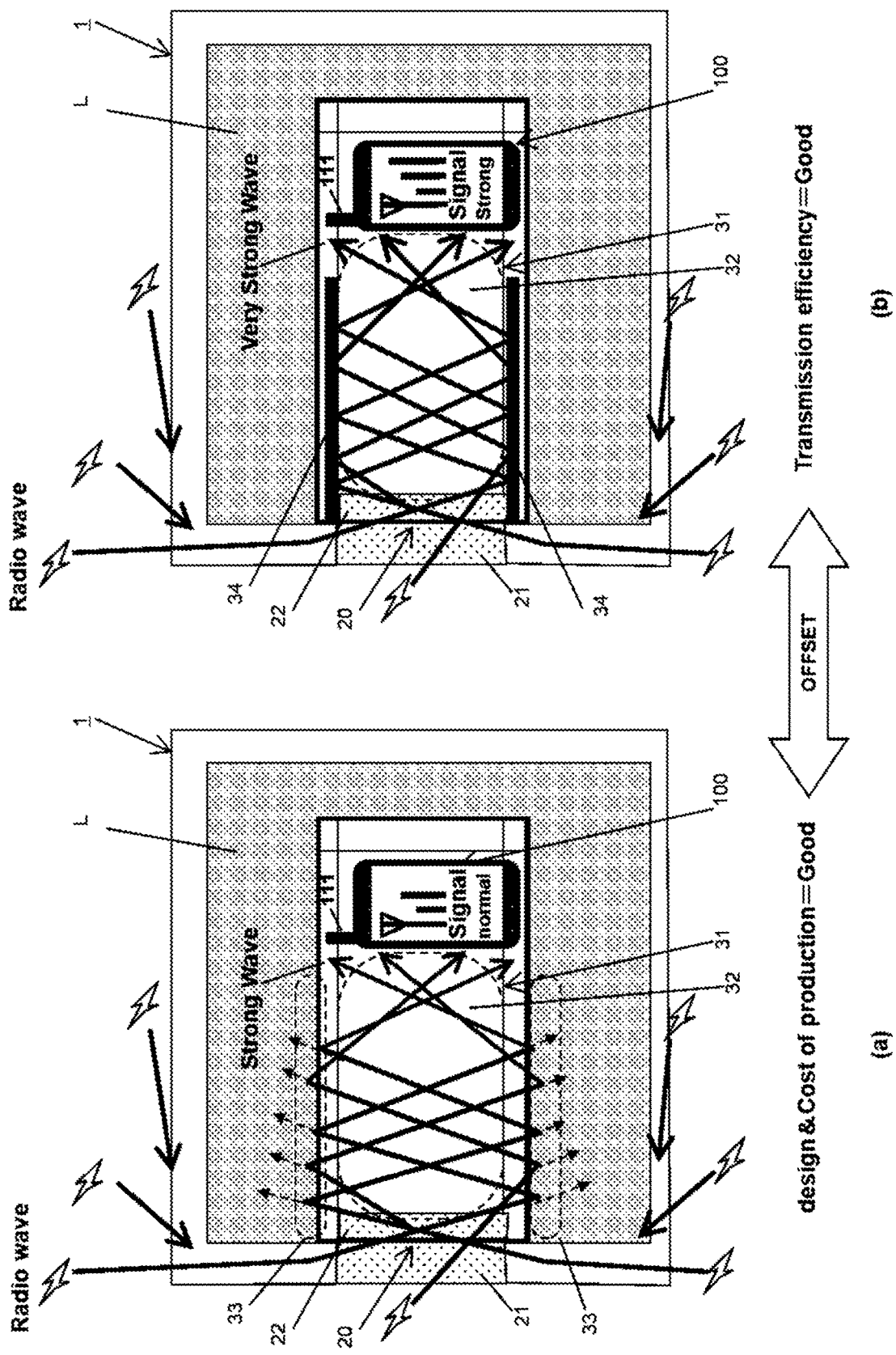
[FIG. 10]

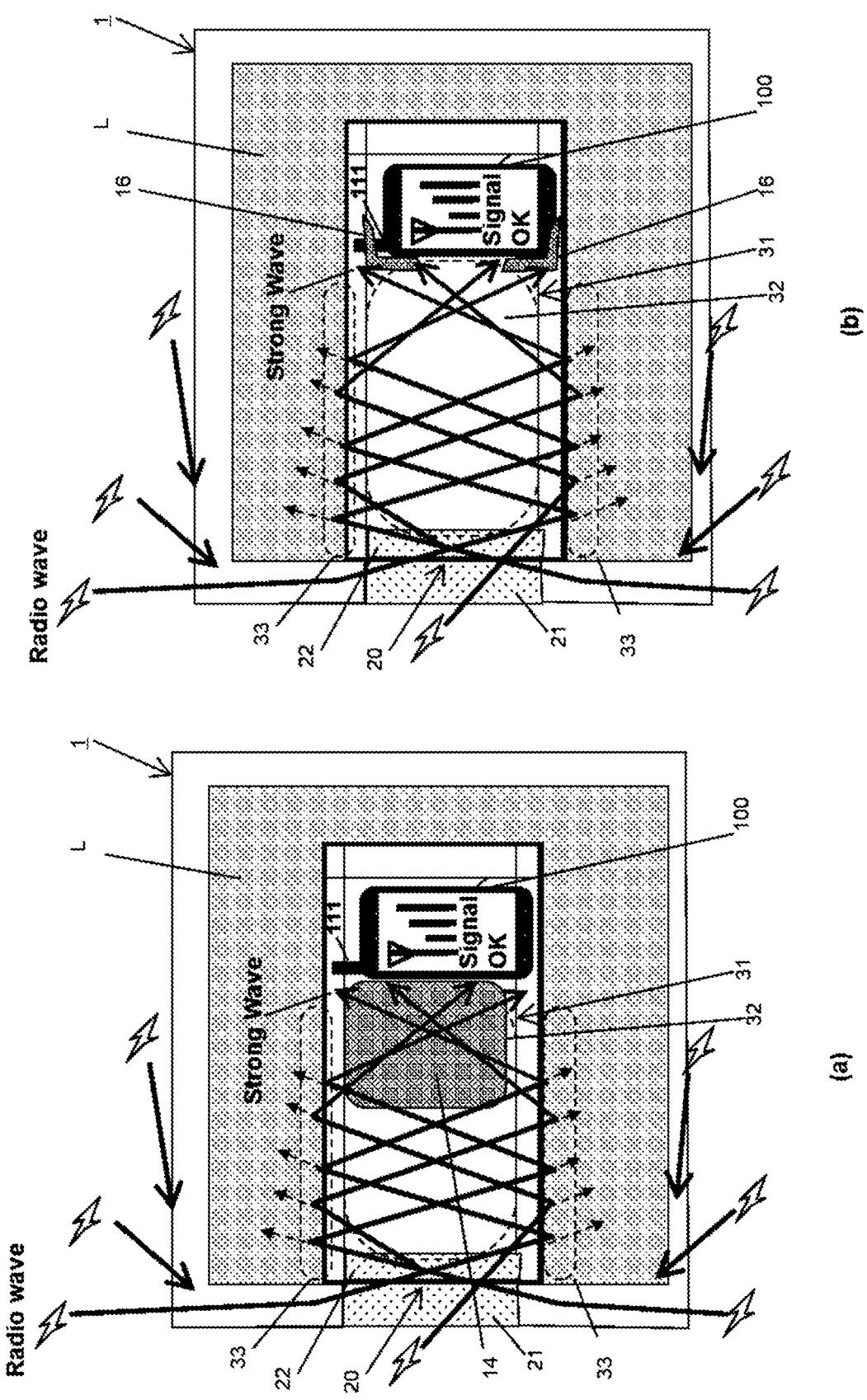

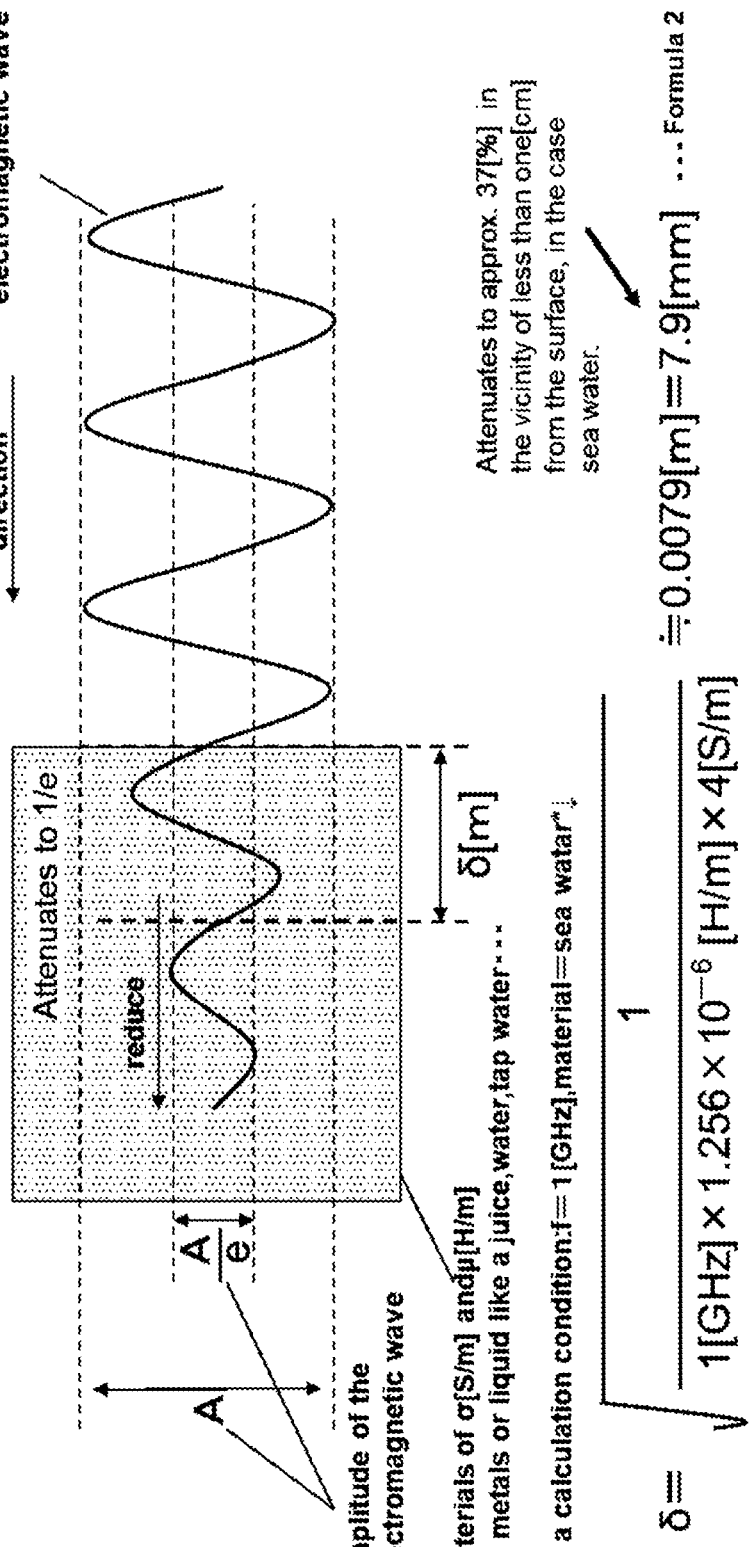

[FIG. 13]
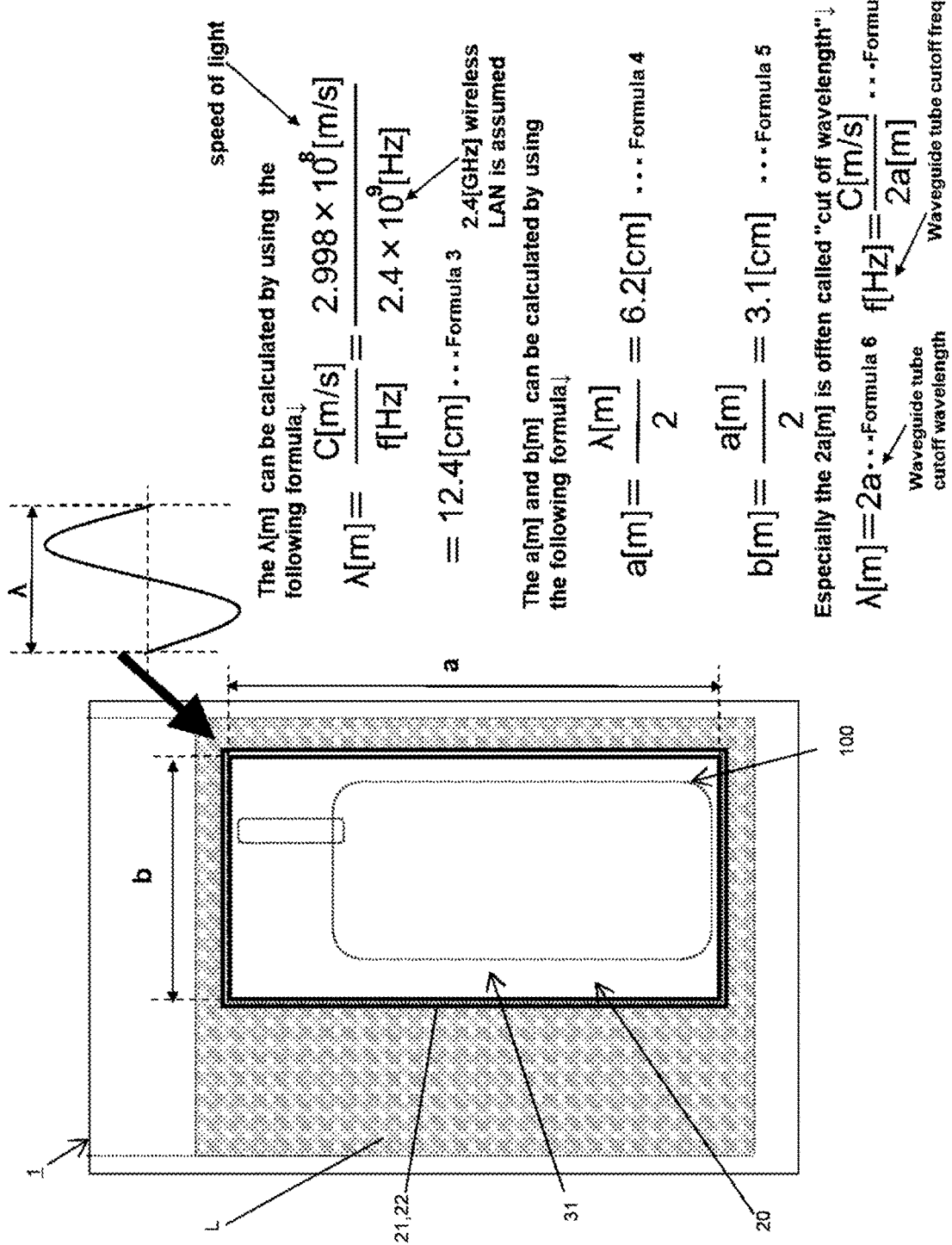

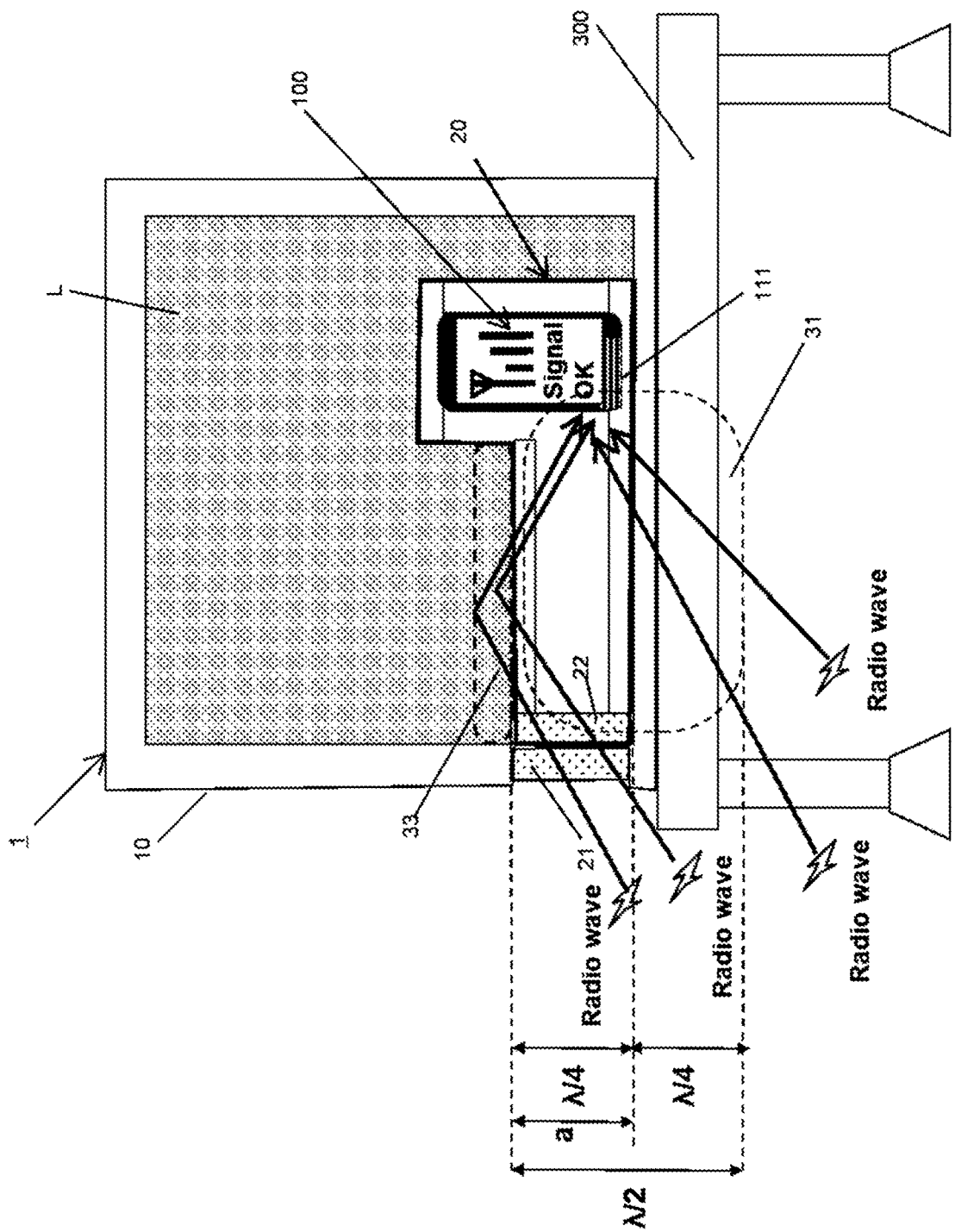
[FIG. 14]

[FIG. 15]
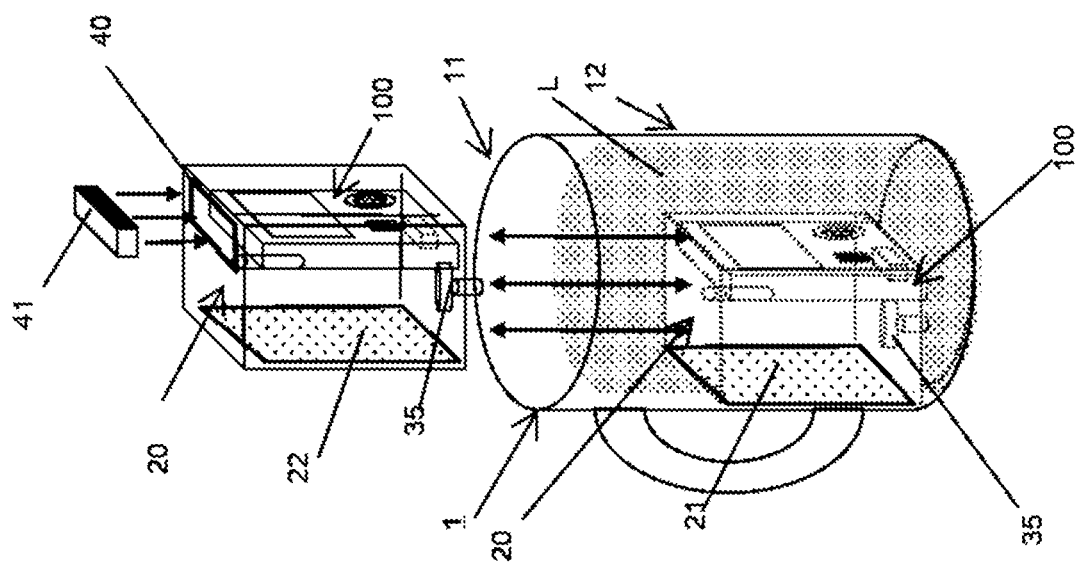

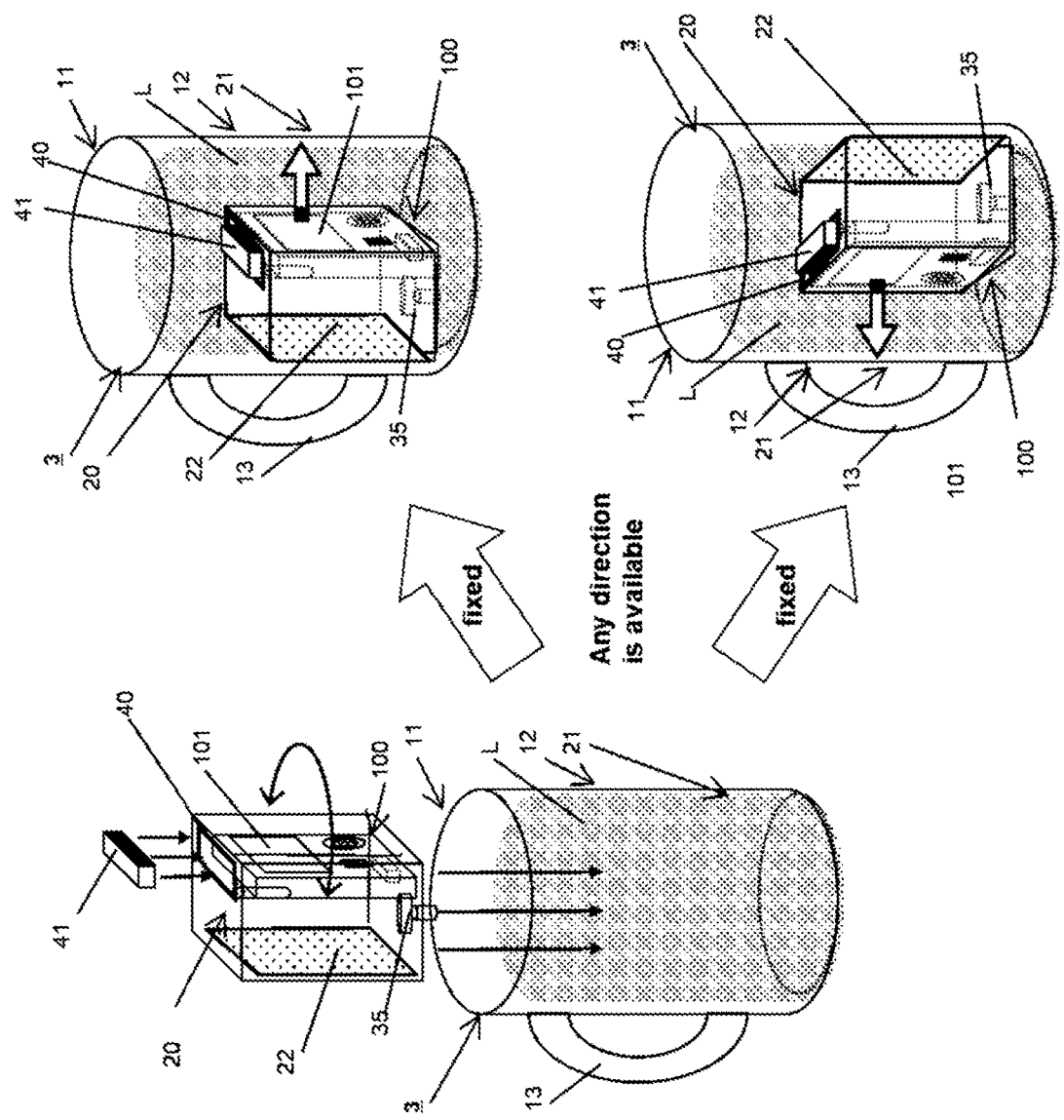
[FIG. 16]

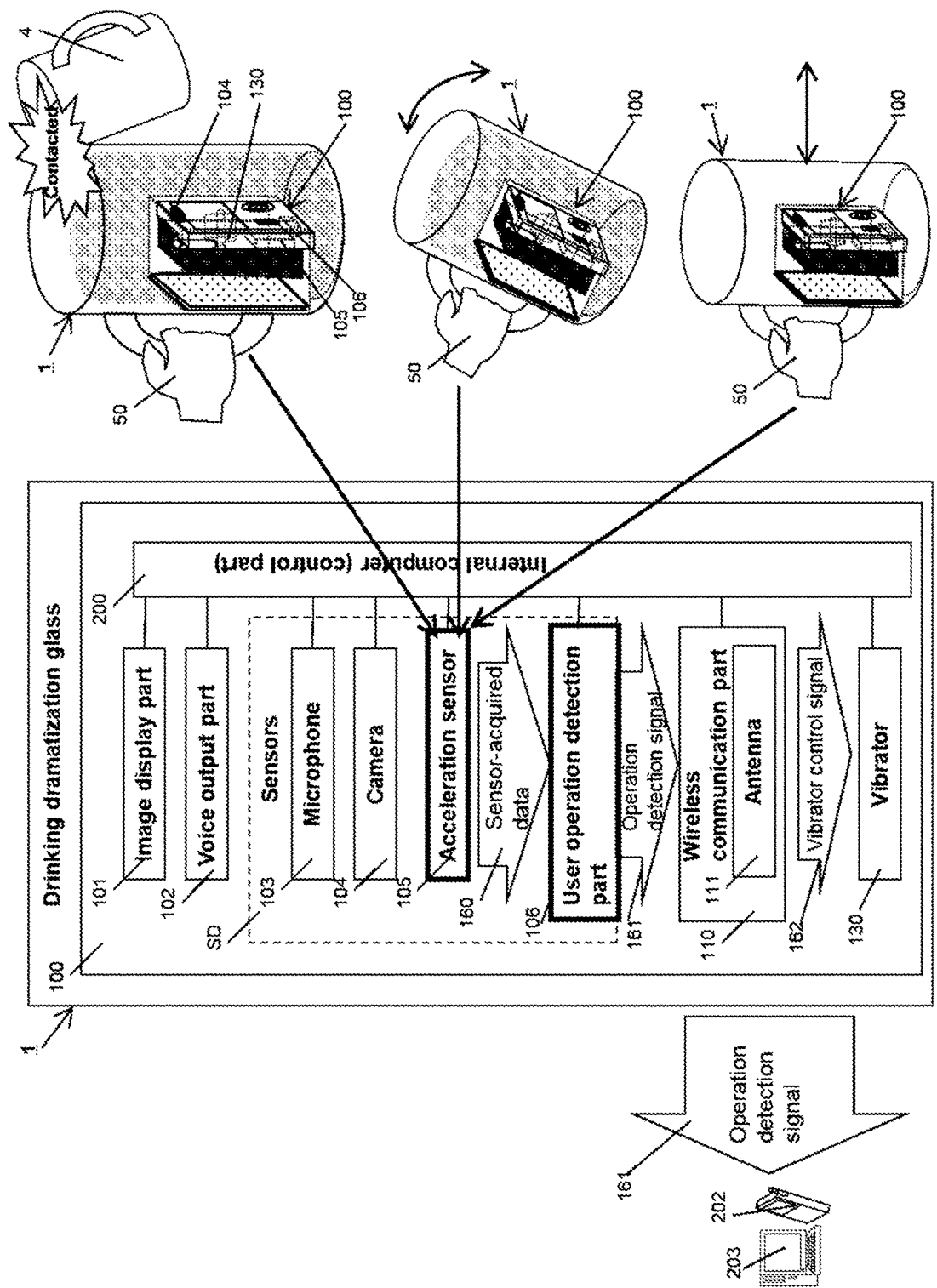
[FIG. 17]

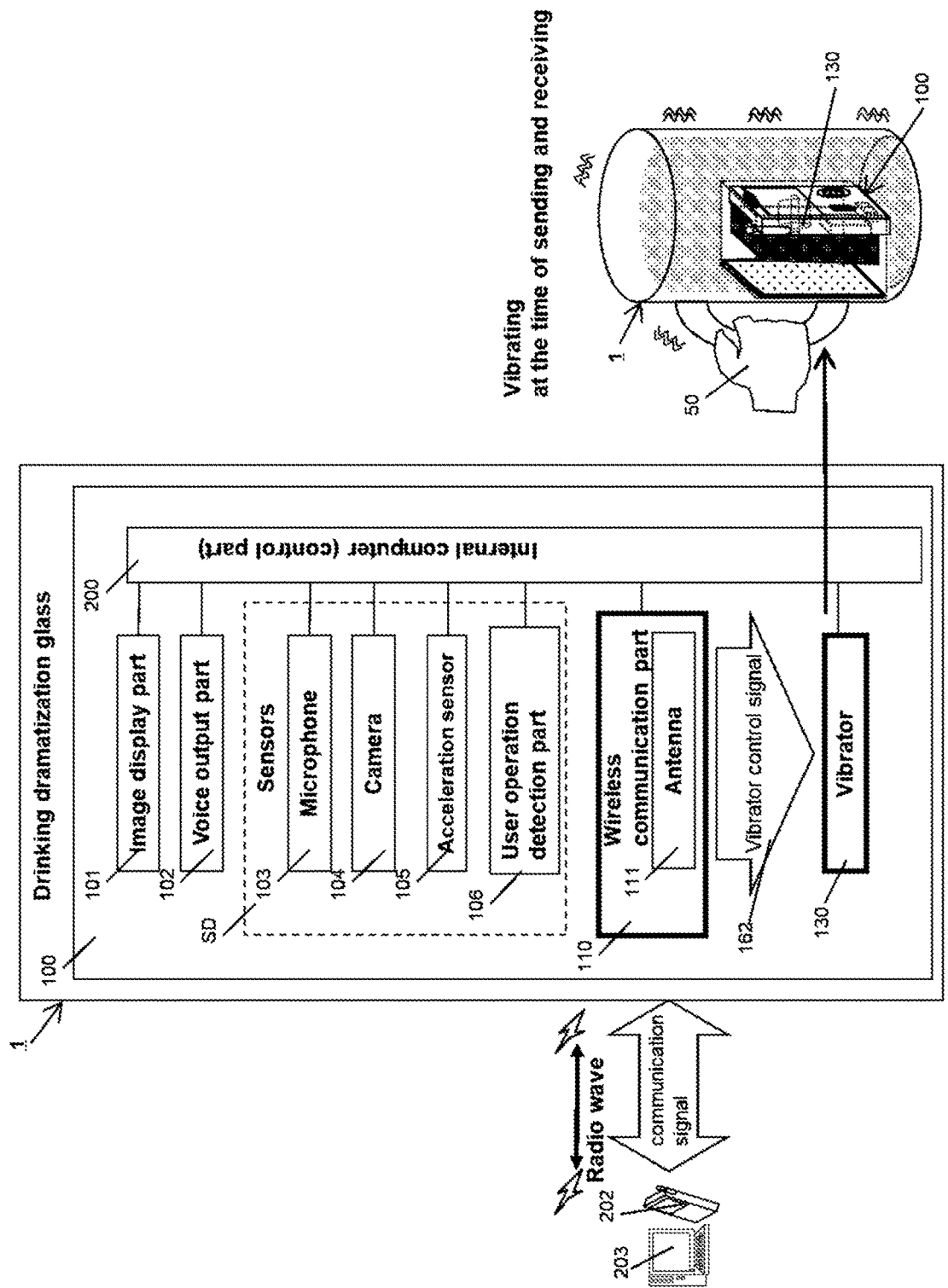
[FIG. 18]

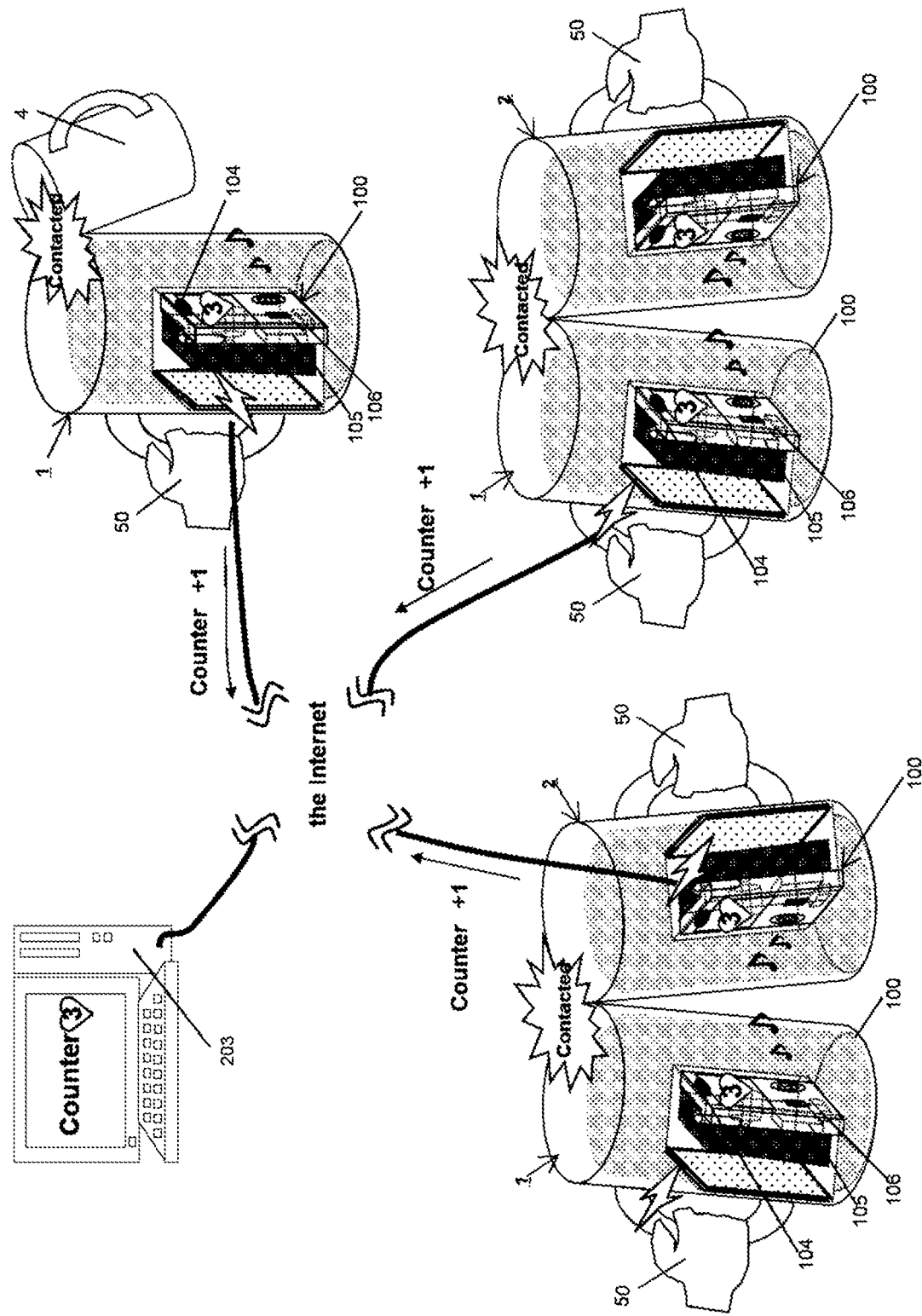
[FIG. 19]

DRINKING DRAMATIZATION GLASS AND REMOTE TOAST COUNTER SYSTEM

CROSS-REFERENCE TO RELATED APPLICATIONS

This application is the U.S. National Phase under 35 U.S.C. § 371 of International Application PCT/JP2019/019008, filed May 13, 2019, which claims priority to Japanese Patent Application No. JP2018-093429, filed May 15, 2018. The International Application was published under PCT Article 21(2) in a language other than English.

TECHNICAL FIELD

The present invention relates to a drinking dramatization glass, and a remote toast counter system, both designed to let an individual enjoy oneself alone or together with others in remote locations, and also to present many different dramatizing effects.

BACKGROUND ART

At parties, receptions and other events, oftentimes the participants toast by clinking their glasses containing drinks, to share joys with one another.

In the past, glasses have been developed that offer various functions in addition to containing drinks.

For example, Patent Literatures 1 and 2 disclose an art of using a sensor to detect that a glass has been raised, and then outputting various sounds from a speaker provided at the bottom of the glass.

Patent Literature 3 discloses an art, pertaining to a glass equipped with a means for detecting its tilt angle, of producing voices according to the tilt angle of the glass.

Patent Literature 4 discloses an art of placing a light-emitting piece in an intermediate layer between the interior wall and the exterior wall of a glass, with the light-emitting piece emitting light when the glass is shaken.

Patent Literatures 5 and 6 disclose an art of placing a display device on the surface of a glass and allowing the image displayed on the display device to be changed manually or according to the output of a motion sensor that detects the state of the glass.

Patent Literature 7 discloses an art of placing a display device on the surface of a glass, while placing a control module and connection terminal in a space at the bottom of the glass. By hardwiring it to an external computer via the connection terminal, the control module can download multiple types of image data and display them on the display device.

BACKGROUND ART LITERATURE

Patent Literature

Patent Literature 1: Japanese Utility Model Laid-open No. Sho 62-92769
Patent Literature 2: Japanese Patent Laid-open No. Hei 3-45213
Patent Literature 3: Japanese Utility Model Laid-open No. Hei 1-81970
Patent Literature 4: Japanese Utility Model Registration No. 3086140
Patent Literature 5: Japanese Patent Laid-open No. 2005-99159
Patent Literature 6: U.S. Patent Laid-open No. 2008/0100469
Patent Literature 7: U.S. patent Ser. No. 08/550,288

SUMMARY OF THE INVENTION

Problems to be Solved by the Invention

However, Patent Literatures 1 to 6 mentioned above involve outputting voices, images, etc., that have been pre-recorded in a memory, etc., or causing a light-emitting piece to emit light, which presents a problem of lack of variations in, and limitations of, dramatizing effects.

Patent Literature 7 requires hardwire connection with an external computer via the connection terminals, which presents a problem of cumbersome operations, as well as a problem of malfunction if the connection terminals get wet.

Also, Patent Literatures 1 to 7 cater to the enjoyment of only the people in the sole space where the glass is placed, which presents a problem that they cannot share their joy with others in remote locations.

In light of the aforementioned problems, the present invention aims to provide a drinking dramatization glass, and a remote toast counter system, both designed to let an individual enjoy oneself alone or together.

Means for Solving the Problems

The drinking dramatization glass proposed by the present invention comprises: a glass body being a bottomed cylinder with a top opening; a storage part for storing a communication device having an image display part that displays images, a wireless communication part equipped with an antenna, a voice output part that outputs voices, and a control part that controls the driving of the foregoing; and a transparent part through which to view, from the exterior, images displayed on the image display part; wherein such drinking dramatization glass is characterized in that a first radio-wave transmission surface, made of a dielectric substance capable of letting radio waves pass through, is formed on the side face of the glass body; the storage part is placed inside the glass body, where a dielectric substance capable of letting radio waves pass through is filled inside the storage part, and a second radio-wave transmission surface, made of a dielectric substance capable of letting radio waves pass through, is formed on the side face of the storage part; the first radio-wave transmission surface and second radio-wave transmission surface are placed at a close-enough distance from each other so that they can let radio waves pass through in a condition where a drink is present between them; and the storage part manifests, when its periphery is surrounded by a drink, a waveguiding function of letting radio waves pass through the interior thereof.

Also, the drinking dramatization glass proposed by the present invention is characterized in that: the communication device is a mobile communication device storing the image display part, the wireless communication part, the voice output part and the control part in a single enclosure; and the storage part has an insertion opening through which to insert the communication device into the storage part.

Also, the drinking dramatization glass proposed by the present invention is characterized in that the first radio-wave transmission surface and second radio-wave transmission surface are both a polygon, and the length of the longest side, among the sides constituting the polygon, is longer than one-half the wavelength of the radio waves.

Also, the drinking dramatization glass proposed by the present invention is characterized in that a part or all of the transparent part is a lens, so that the image display part of the communication device as stored in the storage part can be magnified for viewing from the exterior of the glass body.

Also, the drinking dramatization glass proposed by the present invention is characterized in that: it has a fixing mechanism for fixing the communication device in place inside the storage part; and the fixing mechanism is made of a dielectric substance capable of letting radio waves pass through.

Also, the drinking dramatization glass proposed by the present invention is characterized in that the insertion opening is formed in a manner penetrating through the first radio-wave transmission surface and second radio-wave transmission surface.

Also, the drinking dramatization glass proposed by the present invention is characterized in that the glass body and storage part are made of a flexible material, and the communication device in the storage part can be operated by applying an external force and thereby deforming the glass body and storage part.

Also, the drinking dramatization glass proposed by the present invention is characterized in that it has a lid for closing off the top opening.

Also, the drinking dramatization glass proposed by the present invention is characterized in that the communication device has an acceleration sensor and, when the user moves or tilts the glass body or clinks it against another object, the acceleration sensor transmits an operation-detection signal to the control part and the control part, after receiving the operation-detection signal, transmits an output signal to the exterior via the wireless communication part.

Also, the drinking dramatization glass proposed by the present invention is characterized in that the communication device has a vibrator and, at the timing of radio wave communication initiated by the communication device, the vibrator vibrates and the glass body vibrates as a result.

Also, the drinking dramatization glass proposed by the present invention is characterized in that the communication device has a camera and, upon receiving the operation-detection signal, the control part drives the camera to capture an image and transmits the captured image data to the exterior via the wireless communication part.

Also, the drinking dramatization glass proposed by the present invention is characterized in that: air is filled inside the storage part as the dielectric substance; and there is neither the first radio-wave transmission surface nor the second radio-wave transmission surface, and a through hole is provided instead that continues from the side face of the glass body to the interior of the storage part.

Also, the drinking dramatization glass proposed by the present invention is characterized in that the storage part is removable and installable from/into the glass body.

Also, the drinking dramatization glass proposed by the present invention is characterized in that it has a storage part fixing mechanism for fixing the storage part to the glass body.

Also, the drinking dramatization glass proposed by the present invention is characterized in that the bottom part of the glass body is a dielectric substance and also integrated with a part of the storage part.

Also, the drinking dramatization glass proposed by the present invention is characterized in that: the side face of the glass body is constituted by a transparent dielectric substance capable of letting radio waves pass through, to cause the entire side face of the glass body to function as the transparent part and the first radio-wave transmission surface; and as a result, the orientation of the storage part in the glass body is made changeable.

The remote toast counter system proposed by the present invention comprises two or more drinking dramatization glasses—each identical to the aforementioned drinking dramatization glass; wherein such remote toast counter system is characterized in that, when the user uses any of the drinking dramatization glasses to perform a toasting action, the acceleration sensor transmits a toast detection signal to the control part and the control part, after receiving the toast detection signal, transmits an output signal to an external server computer via the wireless communication part, and as the server computer has been counting the number of times the toast detection signal is received and recording the count as a cumulative number of toasting operations, the user can view the cumulative number of toasting operations.

Effects of the Invention

Skin depth is an indicator of the level of attenuation of the amplitude (strength) of a radio wave as determined by solving a wave motion equation derived from Maxwell's equation of electromagnetism, and represents a distance in which an electromagnetic field (radio wave) incident to a material attenuates to a strength of 1/e ($\approx$1/2.718$\approx$37 [%]) (e is a natural logarithm).

Assuming that a radio wave with a frequency of 1 [GHz] is made incident to sea water, which is a representative example of liquid; in this case, a skin depth of 7.9 [mm] is obtained. This means that the distance in which the amplitude (strength) of the radio wave incident to sea water attenuates to 1/e ($\approx$37 [%]) is 7.9 [mm], and that, when a radio wave of 1 [GHz] (frequency ranges currently used by mobile phones in Japan are approx. 800 [MHz] to 3 [GHz]) is made incident to sea water in a glass cup, for example, it will attenuate to 37 [%] or less before making its way by no more than 1 [cm] from the surface of the cup. (In reality, it will attenuate more because of attenuations not only due to the sea water, but also due to the glass cup, etc. Also, with sea water taken from the waters with high concentrations of impurities and salt, the levels may far exceed the aforementioned sea water attenuation because of these impurities.) Other liquids, such as thick juices as well as cocktails and other alcoholic drinks made therewith, may contain more impurities than does sea water, in which case they will naturally cause greater attenuations compared to sea water.

Also, the higher the frequency of a radio wave, the shorter its skin depth becomes. In recent years, frequencies of 1 [GHz] to 3 [GHz] or even higher are used by high-speed packet communication services, etc., for mobile phones and other mobile communication terminals; however, radio waves of these frequencies as well as 2.4 [GHz], 5 [GHz] (IEEE 802.11n), 60 [GHz] (IEEE 802.11ad) and other Wi-Fi wireless LANs, etc., are subject to much greater attenuations than those of a frequency of 1 [GHz].

As described above, city water, soft drinks, alcoholic drinks, and other liquids containing impurities have a property of blocking radio waves, unlike air.

When a liquid is poured in the glass body while the mobile communication device—which is a communication device equipped with an image display part and a voice output part capable of outputting image contents and voice contents, respectively, or specifically a mobile phone, smartphone, PDA, tablet terminal, etc.—is stored in the storage part, the periphery of the storage part is entirely or partially covered with the liquid, and therefore the liquid serves as a shielding material. As a result, problems will arise such as loss of communication function that utilizes radio waves from the wireless communication part, disabled communication of image data, voice data, etc., and significant lowering of baud rate [bps].

The drinking dramatization glass proposed by the present invention has a storage part inside the glass for storing the communication device, and it also has a first radio-wave transmission surface and a second radio-wave transmission surface—both made of a dielectric substance capable of letting radio waves pass through—with the two contacting the side face of the glass body and the side face of the storage part. A dielectric substance capable of letting radio waves pass through is filled in the storage part. When a drink is filled in the glass body, radio waves output from the exterior of the glass body pass through the first radio-wave transmission surface and second radio-wave transmission surface and travel through the storage part, to reach the wireless communication part of the communication device.

This is based on the basic law of physics that "electromagnetic energy transmits in a direction in which energy transmission is facilitated." Since radio waves are more resistant to attenuation and transmit more easily in air and other dielectric substances than in drinking water, surrounding the periphery of the storage part with drinking water causes radio waves to transmit in air or other dielectric substances instead, thereby giving directionality to the radio waves, or put differently, allowing the storage part itself to manifest waveguiding function. In other words, the storage part will also function as a waveguide tube because of the drinking water around its periphery.

This means that, even when the glass body is filled with a drink, the wireless communication part of the mobile communication device in the storage part can receive image data and voice data for dramatization from the exterior, and the image contents and voice contents can be output at the image display part and the voice output part.

Also, because the storage part functions as a waveguiding space, the volume of drink that can be filled in the glass body will not be lost and the number of steps through which to manufacture the drinking dramatization glass can be reduced, compared to when a separate waveguiding space is provided.

Also, providing an opening in the side face of the glass body allows the job of storing the communication device in the storage part to be completed by simply moving the communication device in the horizontal direction. Compared to the method of inserting the communication device through the bottom part of the glass body, there is no need to raise or tilt the glass body every time the communication device is taken out of or put in the storage part. Another advantage is that a sudden incoming call can be answered quickly, because the communication device can be removed with the glass body still placed on a table.

Also, data output from the communication device in the storage part, such as voice data, image data, and various other data detected by sound sensors, camera sensors or various other sensors, can be transmitted to the exterior by utilizing the waveguiding function of the storage part. The various data transmitted to the exterior can be directly received and played by other drinking dramatization glass or computer, or received and played via an external server connected to the Internet. Use of a server as an intermediary also allows for synchronous playback of image contents and voice contents among multiple drinking dramatization glasses in remote locations.

As described above, one feature of the present invention is that, when the communication device is stored in the storage part and a drink is filled in the glass body, no hardwire cable or externally installed antenna, etc., for amplifying radio waves is required as a means for communicating with the wireless communication part of the communication device, as this is realized by the storage part having waveguiding function, the glass body, and the first radio-wave transmission surface and second radio-wave transmission surface.

With the drinking dramatization glass proposed by the present invention, an individual can enjoy oneself together with not only others nearby, but also others in remote locations, through many different ways of dramatization such as playing image and voice from the communication device stored in the glass body, generating vibrations, and changing image and sound, at a timing of a toast.

It should be noted that a timing of a toast can be detected by acquiring with an acceleration sensor, through the communication device in the storage part, the impact of glasses clinking together when a toast is made.

The image contents displayed on the image display part of the communication device can be viewed through the drink and transparent part. Depending on the color of the drink poured in the glass body, unique dramatizing effects can also be expected. For example, images with amber hue can be enjoyed when amber-colored whisky is poured, and by further adopting a glass lens or other lens mechanism for the transparent part, the image display part of the communication device can be magnified for viewing from the exterior of the glass body. Also, when the side face of the glass body has a curved part, pouring a drink achieves the dramatization effect of magnifying the image display part for viewing due to the difference between the refractive index of the drink and that of air.

It should be noted that, after the communication device is stored in the storage part, the communication device can be fixed in place with a fixing mechanism made of a solid dielectric material that lets radio waves pass through, to allow the communication device to be stored in the storage part easily and securely without disrupting wireless communication.

As for the material with which to constitute the glass body and storage part, constituting them with a material flexible enough to deform when an external force is applied allows the touch panel, etc., of the communication device to be pushed and operated, through the drink, by applying an external force with a finger, etc., from the exterior of the glass body and thereby deforming the storage part and glass body.

In general, a "waveguide tube (or, strictly speaking, hollow waveguide tube used in the millimeter-wave band)" comprises two constitutional elements including: an area filled with a material that lets radio waves pass through, such as air or any dielectric substance, to serve as a waveguide part letting the radio waves inside pass through; and an area constituted by a layer of copper or other metal, to serve as a conductor part surrounding the waveguide part and reflecting radio waves.

With the drinking dramatization glass proposed by the present invention, a juice or other impurity-containing liquid (drink) filled in the glass body is used directly as the conductor part, instead of a metal. To manufacture the storage part under the present invention, all that is needed may be to inwardly concave the glass, acrylic, etc., constituting the side face (exterior wall) of the glass body. In the case of a drinking PET bottle, etc., for example, all that is needed is to apply heat from the side face to deform the glass body in the inward direction to form a concaved part. This way, the storage part, and the insertion opening through which to insert the communication device, can be formed simultaneously in the drinking PET bottle, etc., which can substantially shorten the manufacturing process.

Also, covering the periphery (inner face and/or outer face) of the storage part with a metal (or, specifically, constituting this component in exactly the same way as a normal hollow waveguide tube) can cause radio waves to reflect on the metal surface, thereby reducing the radio wave components to be absorbed in a liquid and thus attenuated. As a result, radio waves can be transmitted efficiently in the direction of the antenna of the communication device.

Also, the storage part under the present invention has a dielectric substance filled in at least a part of its interior, so that it will function as a waveguiding space. In this case, the dielectric substance is air or other gas, and the like, but a solid dielectric substance may be filled inside the waveguide tube. However, a space needed to store the communication device from the exterior must be secured at the minimum. By filling the interior of the waveguide tube with a solid dielectric substance other than air or other gas that lets radio waves pass through, or specifically filling the interior of the waveguide tube with glass or acrylic, the strength of the storage part can be increased without having to lower the radio-wave transmission efficiency, i.e., communication quality. Also, a situation where stirring of ice in the glass body causes the ice to hit the storage part and damage the storage part and communication device can be prevented.

With the drinking dramatization glass proposed by the present invention, the storage part may be constituted as a standalone unit removable through the top opening of the glass body. This makes it possible to change the drinking dramatization glass to a normal drinking glass and, when the drinking dramatization glass is used as a normal drinking glass, the storage part can be removed to accommodate a greater volume of drink.

Also, by making the entire side face of the glass body with a transparent dielectric substance that lets radio waves pass through (thereby providing a glass entirely made of glass or acrylic, for example), the entire side face of the glass body can serve as the first radio-wave transmission surface as well as the transparent part. This way, when the removable storage part is fixed in the glass, the storage part can be oriented in any direction, and the image display part of the communication device can also be oriented in any direction, and installed in these fixed positions. As described, the orientation of the image display part of the drinking dramatization glass can be easily adjusted to any direction on the glass side face according to how the glass is used by the user.

A majority of commercially available smartphones, mobile phones, and other communication devices have an acceleration sensor inside. Because an acceleration sensor is capable of capturing the accelerations along three axes, the data captured by this acceleration sensor can be used to detect which of the operations—moving operation, tilting operation, and operation of clinking against another object—has been performed by the user on the glass body. Furthermore, an operation-detection signal, etc., indicating that this user operation has been detected, can be transmitted to an external computer, at the timing of detection of the user operation, using the wireless communication part of the communication device. This makes it possible to change the image displayed on the image display device of a personal computer, server, mobile phone, smartphone, etc., in a remote location to a different image, or change the sound from the voice output device of a mobile phone, smartphone, etc., in a remote location, at the timing of performance, by the user, of an operation of tilting the drinking dramatization glass or clinking it against another object (toasting operation). Also, a remote server can be utilized to tally and publish the number of toasting operations in real time.

If the communication device is a mobile phone or smartphone with a camera, images captured by the camera can also be transferred to remote locations.

As described above, the drinking dramatization glass proposed by the present invention has the advantage of being applicable to various systems, because it permits external transfer of data even when filled with a drink.

BRIEF DESCRIPTION OF THE DRAWINGS

FIG. 1 A perspective view (a), and a cross-section view (b), showing the drinking dramatization glass in the first embodiment.

FIG. 2 A block diagram showing the internal system constitution of a drinking dramatization glass.

FIG. 3 A drawing showing a drinking dramatization glass, etc., being connected to a communication line.

FIG. 4 A perspective view showing another constitutional example of the glass body.

FIG. 5 A perspective view showing a bottle-shaped drinking dramatization glass.

FIG. 6 Constitutional examples (a) to (c) of the storage part.

FIG. 7 Constitutional examples (a) to (c) of the insertion opening for the storage part.

FIG. 8 Examples (a), (b) of using a flexible material for the glass body and storage part to make push operations on the touch panel possible.

FIG. 9 Cross-section views of glasses showing the difference in radio waves between the glasses proposed by the present invention with and without a waveguide tube.

FIG. 10 Cross-section views of glasses showing the difference in radio waves between the glasses proposed by the present invention with and without a metal layer in the waveguide tube.

FIG. 11 Cross-section views of glasses showing examples of how the communication device is fixed in the storage part of the glass proposed by the present invention.

FIG. 12 An explanation of electrical conductivity (conductance) and skin depth, and an example of calculating the attenuation distance of radio waves in a liquid.

FIG. 13 An example of calculating the size of the waveguiding space of columnar shape.

FIG. 14 An example of the size of a waveguiding space where the dielectric substance constituting the storage part is integrated with that constituting the bottom part of the glass.

FIG. 15 A perspective view showing the drinking dramatization glass in the second embodiment (constitutional drawing 1 of the mechanism of removing the storage part).

FIG. 16 Constitutional drawing 2 of the mechanism of removing the storage part.

FIG. 17 Perspective views showing the drinking dramatization glass in the third embodiment, and a block diagram thereof (a block diagram showing the internal system constitution of a drinking dramatization glass that detects and transmits the operated state of the glass).

FIG. 18 A block diagram showing the internal system constitution of a drinking dramatization glass that causes a vibrator to vibrate when a communication is transmitted or received.

FIG. 19 A drawing showing the constitution of a toast dramatization system (schematic constitutional drawing of a remote toast counter system).

MODE FOR CARRYING OUT THE INVENTION

[First Embodiment of Drinking Dramatization Glass]

The first embodiment of the drinking dramatization glass proposed by the present invention is described below using drawings.

As shown in FIG. 1 to FIG. 3, the drinking dramatization glass 1 is roughly constituted by a glass body 10, a transparent part 12, and a storage part 20.

The glass body 10 is a bottomed cylinder with a top opening 11, allowing drinking water and other liquids to be filled inside. The material for the glass body 10 may be glass, resin, ceramic, porcelain, etc., just like for general glasses.

The glass body 10 has, on its side face, a first radio-wave transmission surface 21 made of a dielectric substance capable of letting radio waves pass through. If the entire side face of the glass body is made of glass or other dielectric substance, the entire side face can be utilized as the first radio-wave transmission surface 21. If, on the other hand, the entire side face of the glass body is made of a metal or other substance that does not let radio waves pass through, a first radio-wave transmission surface made of a dielectric substance must be provided separately in a part of the side face.

The storage part 20 allows a mobile communication device 100 to be stored inside. The storage part 20 is placed inside the glass body.

The storage part 20 has, on its side face, a second radio-wave transmission surface 22 made of a dielectric substance capable of letting radio waves pass through. To let radio waves on the exterior of the glass pass through to the interior of the storage part 20, the first radio-wave transmission surface 21 and the second radio-wave transmission surface 22 are placed in a close relationship with each other. To be specific, the first radio-wave transmission surface 21 and the second radio-wave transmission surface 22 are placed at a close-enough distance from each other so that they can let radio waves pass through in a condition where a drink is present between them.

Also, a dielectric substance capable of letting radio waves pass through is filled inside the storage part 20. When its periphery is surrounded by a drink L, the storage part 20 manifests a waveguiding function of letting radio waves pass through the interior thereof. In other words, the interior of the storage part 20 functions not only as a space for storing the mobile communication device 100, but also as a waveguiding space. The waveguiding function of the storage part 20 is described later.

The storage part 20 has an insertion opening 40 through which to insert the mobile communication device 100 into the interior thereof. It should be noted that FIG. 2 and FIG. 3 are referenced commonly in each of the embodiments.

The transparent part 12 is provided to allow images displayed on the image display part 101 of the mobile communication device 100 to be viewed from the exterior, which is described later. In this embodiment, the entire glass body 10 is utilized as the transparent part 12. The user U can view image contents 150 displayed on the image display part 101 of the mobile communication device 100 as stored in the storage part 20, from the side face of the glass body 10 through the transparent part 12.

The mobile communication device 100 comprises: an image display part 101 that displays images; a wireless communication part 110 with an antenna 111; a voice output part 102 that outputs voices; and a control part 200 that controls the driving of the foregoing. The mobile communication device 100 in this embodiment is integrally constituted by storing these image display part 101, wireless communication part 110, voice output part 102, and control part 200 in a single enclosure. The image display part 101 outputs image contents 150 and other images. The voice output part 102 is a so-called speaker for outputting voice content 151 and other sounds, as well as sounds during calls, from the mobile communication device 100. There is a microphone 103, which is a voice input device used during calls through the mobile communication device 100.

For the mobile communication device 100, it is not necessary to always use a mobile communication device whose image display part 101, wireless communication part 110, voice output part 102, and control part 200 are stored in a single enclosure; instead, all or some of the image display part 101, wireless communication part 110, voice output part 102, and control part 200 may be constituted separately and stored individually in the storage part 20.

The mobile communication device 100 is a general term for devices that permit exchange of sound and image data (radio waves) among multiple such devices via a communication line A, such as mobile phones, smartphones, mobile tablet terminals and PDAs, for example. The communication line A may be the Internet or other network, or a telephone line.

The control part 200 is a control computer of the mobile communication device 100, and the like, equipped with a CPU and a memory and used, to control the various data to be output to the image display part 101 and voice output part 102, control the communications by the wireless communication part 110, and control the microphone 103 and other sensors.

In this embodiment, a fixing plug 14 made of a dielectric substance capable of letting radio waves pass through is used as a fixing mechanism for fixing the mobile communication device 100 inside the storage part 20. The material of the fixing plug 14 may be rubber, low-resilience urethane, glass, wood (dry), etc., that will not shield radio waves. These are materials that do not shield radio waves (dielectric substances), and thus will not interfere with the function of the storage part 20 as a waveguide tube (waveguiding function) no matter where they are placed in the storage part. It should be noted that, for the fixing mechanism, screws and stoppers made of a dielectric substance may be used.

In this embodiment, the entire glass body 10 is formed by glass or other material having transparency so that the entire glass body 10 represents the transparent part 12; as shown in FIG. 4, however, the transparent part 12 may be provided only in a part of the glass body 10.

Since the refractive index of the drink L is different from that of air, pouring the drink L in the glass body 10 achieves the dramatization effect of magnifying the image display part 101 as viewed from the user U. Particularly when a curved part exists in the side face of the glass body 10, the drink L itself manifests the lens effect and this dramatization effect based on magnification intensifies as a result. It should be noted that, among underwater photographers and divers, it is a well-known fact that objects in water appear approx. 1.3 times larger due to the ratio of the refractive indexes of water and air.

Also, using a glass lens or other lens for a part or all of the transparent part 12 is another way to allow the image display part 101, as stored in the storage part 20, to be magnified for viewing from the exterior of the glass body 10.

It should be noted that, if the glass body 10 has no transparent part 12, the user U can only listen to the voices output from the mobile communication device 100.

The shape of the glass body 10 may be a so-called mug type with a handle 13 as shown in FIG. 1, or a bottle type having a lid 15 for closing off the top opening 11 as shown in FIG. 5.

The storage part 20 is placed inside the glass body 10 in such a way that its second radio-wave transmission surface 22 faces the first radio-wave transmission surface 21 of the glass body 10. In FIG. 6(*a*), the mobile communication device 100 in the storage part 20 is fixed in place vertically to the bottom part of the glass body 10; however, the present invention is not limited to this and, for example, as shown in FIG. 6(*c*), the mobile communication device 100 may be placed at an angle to the bottom part of the glass body 10 by shaping the fixing plug 14 as a triangular prism having sloping faces. As a result, the image display part 101 of the mobile communication device 100 tilts upward, which achieves the effect of making it easy for the user U to view the image display part 101.

Also, the storage part 20 need not always be placed at the center part of the glass body 10 as shown in FIG. 6(*a*) and, if no dramatization effect is needed for the image contents 150 by utilizing the color of the drink, the mobile communication device 100 may be placed near the side face of the glass body 10 as shown in FIG. 6(*b*), in which case the image display part 101 of the mobile communication device 100 can face either the direction of the drink L or the direction of the exterior side of the glass body 10.

The insertion opening 40 is a hole connecting the interior and the exterior of the storage part 20, and may be provided at any location on the storage part 20. For example, it may be provided on the top face of the storage part 20 as shown in FIG. 7(*a*). This allows the mobile communication device 100 to be inserted from the top opening 11 of the glass body 10 and fixed. It should be noted that, if the insertion opening 40 is provided on the top face of the storage part 20, a waterproof plug or lid must be placed to prevent the drink L from entering the interior of the storage part 20 from the insertion opening 40.

The insertion opening 40 may be formed by opening a hole that penetrates through the first radio-wave transmission surface 21 and second radio-wave transmission surface 22, as shown in FIG. 7(*b*). This allows the mobile communication device 100 to be easily removed through the insertion opening 40 in the horizontal direction without having to raise the glass body 10 from a table or drain the drink in the glass body 10. Furthermore, the radio wave transmission efficiency can be increased because air is an excellent dielectric substance that radio waves can pass through easily. However, caution is required that opening too large a hole in the first radio-wave transmission surface 21 and second radio-wave transmission surface 22, as the insertion opening 40, can present problems relating to the strength of the glass body 10. For this reason, the insertion opening 40 may be provided in such a way that the first radio-wave transmission surface 21 and second radio-wave transmission surface 22 are made removable, as shown in FIG. 7(*c*). In this case, the strength can be increased compared to when the method of opening a hole in the first radio-wave transmission surface 21 and second radio-wave transmission surface 22 is used.

It should be noted that, if doing so does not present any problems with the strength of the glass body 10, the first radio-wave transmission surface 21 and second radio-wave transmission surface 22 may not be provided and instead, a through hole continuing from the side face of the glass body 10 to the interior of the storage part 20 may be provided and air used as the dielectric substance filled in the storage part 20. In other words, the constitution may be such that the first radio-wave transmission surface 21 and second radio-wave transmission surface 22 in FIG. 7(*c*) remain removed at all times. This allows for maximum increase in the radio wave transmission efficiency of the drinking dramatization glass 1 proposed by the present invention. Also, the manufacturing becomes easy because all that is needed is to inwardly concave the glass, acrylic, etc., constituting the side face (exterior wall) of the glass body 10, and there is no need to form a separate insertion opening 40, either.

The material with which to constitute the glass body 10 and storage part 20 may be polyethylene terephthalate used for PET bottles, etc., or other material flexible enough to deform when an external force is applied. This way, as shown in FIGS. 8(*a*) and (*b*), the mobile communication device 100 in the storage part 20 can be pushed and operated by applying an external force with a finger, etc., from the exterior of the glass body 10 and thereby deforming the glass body 10 and storage part 20. Normally, smartphones and mobile phones have either buttons or a touch panel, and these devices can be operated from the exterior of the glass body 10 while a drink is filled in it. It should be noted that, to further facilitate the push operations from the exterior of the glass body 10, a transparent soft vinyl chloride (commonly known as "soft PVC," which is a waterproof material often used for float tubes) or other more pliable material may be used partially, or only for the areas of the glass body 10 and storage part 20 that must be used to push the image display part 101 of the mobile communication device 100.

Normally, radio waves entering a city water, drinking water, or other liquid containing impurities attenuate due to the conductivity σ [S/m] of the liquid, and in 1 [GHz] and higher ranges used for mobile phones, high-speed wireless LANs, etc., the skin depth δ [m] drops to the centimeter order or shorter, and consequently the radio waves will mostly attenuate in the vicinity of the entry surface, as shown in FIG. 12, and will scarcely pass through to the interior. (For more details, please refer to technical books on radio wave engineering.) For this reason, Wi-Fi wireless transmission and reception to/from mobile phones is normally disabled in water.

The storage part 20, as shown in the cross-sectional view in FIG. 9 (*b*), comprises a waveguiding space 31 (this space is often referred to simply as "waveguiding part of waveguide tube" in the field of microwave power transmission) and a conductor part 33.

The mechanism is that the waveguiding space 31 is filled with a dielectric substance 32 that lets radio waves pass through, such as air or other gaseous matter, or glass, acrylic, or other solid matter, and by surrounding the periphery thereof with the conductor part 33, the radio waves are focused and their directionality strengthened (induced) in the moving direction to the mobile communication device 100 (wireless communication part 110) in the storage part 20.

Radio waves are governed by the basic law of physics that their energy transmits preferentially to locations where energy transmission is facilitated (strictly speaking, this is called the principle of least action); accordingly, radio waves transmit preferentially in the waveguiding space 31 through repeated diffractions, reflections, etc., to avoid the drink in the glass body 10, and are guided (increasingly directed) to the mobile communication device 100 in the storage part 20, thereby allowing the mobile communication device 100 to communicate with the exterior even when a drink is filled in the glass body 10.

It should be noted that waveguide tubes used in the microwave power transmission, etc., in microwave ovens, antenna feed, and the like, use a layer of copper, stainless steel, or other metal of high conductivity σ [S/m] for their conductor part surrounding a waveguiding space for letting radio waves pass through; as shown in FIG. 9(b), on the other hand, the present invention utilizes drinking water or other liquid which is filled in the glass body 10 and contains impurities (or, strictly speaking, has conductivity) to attenuate radio waves, for the conductor part, instead of a metal (in other words, the liquid surrounding the waveguiding space 31 serves as the conductor part 33). For this reason, the waveguiding space 31 is not a waveguide tube in the strict sense, but a subspecies thereof which is specially designed for the drinking dramatization glass 1 under the present invention, and the liquid deployed around the waveguiding space 31, instead of a metal, serves as a radio-wave reflection medium to strengthen the directivity of radio waves to the mobile communication device 100 in the storage part 20 (that is, in the waveguiding space 31). Accordingly, in principle, the waveguiding space 31 manifests its waveguiding function as a waveguide tube more when there are more impurities in the liquid (drink) filled in the glass body 10 (or, strictly speaking, when its conductivity is higher), that is, when it is more difficult for the liquid filled in the glass body 10 to let radio waves pass through.

Also, while the transparent glass design is sacrificed, the periphery of the waveguiding space 31 may be covered with a copper or other metal layer 34 with high conductivity σ [S/m] so as to further increase the radio-wave power transmission efficiency, as shown in FIG. 10(b). Because the conductivity of a metal is far higher than that of drinking water, radio waves can be reflected efficiently and this added reflection efficiency strengthens the directionality of radio waves further compared to when the conductor part 33 comprises a liquid alone. It should be noted that the thickness of the metal layer 34 only needs to be in the order of 0.1 [mm], because the radio wave frequencies used for mobile phones and wireless LANs are approx. 0.8 to 1 [GHz] or even higher.

It should be noted that, other than air (air is one of the dielectric substances that let radio waves pass through most easily), a solid dielectric substance such as glass, acrylic, low-density urethane, wood (dry and liquid-free), for example, may be present in the waveguiding space 31 as the dielectric substance 32, so long as it is a dielectric substance that lets radio waves pass through. Also, the radio-wave transmission distance in the waveguiding space 31 is limited by the diameter of the glass body 10 and ranges from several centimeters to 10-plus centimeters or so at most, which means that, even if the entire waveguiding space 31 is filled with glass (glass is an excellent dielectric substance that lets radio waves pass through) or other dielectric substance, any effect of the glass on the radio-wave transmission efficiency is too small to be measured in theory and therefore sufficient waveguiding function will be maintained. If dropping of a large amount of ice into the glass body 10 or stirring of ice in the glass body 10 at high speed is envisioned, glass, acrylic or other solid dielectric substance may be filled in the waveguiding space 31 as the dielectric substance 32. In reference to FIG. 9(b), for example, glass, acrylic or other dielectric substance may be filled in the entire waveguiding space 31, so that damage that would otherwise result from ice hitting the storage part 20, can be prevented.

It should be noted that, if the bottom parts or bottom faces of the storage part 20 and glass body 10 are also made of glass, acrylic or other dielectric substance, they may be placed in contact with each other and integrated by means of thermal fusion, etc., or they may be formed as one piece. Normally, the bottom part of a drinking glass has enough thickness to withstand the impact from being set down on a tabletop (normally a thickness of approx. 1 [cm] to 2 [cm]). Likewise, with the drinking dramatization glass 1 proposed by the present invention, the bottom parts or bottom faces of the storage part 20 and glass body 10 can be integrated by means of thermal fusion, etc., to increase the strength of the bottom of the storage part 20. Furthermore, the antenna 111 will be able to receive radio waves from the bottom part of the glass body 10 because the material of the bottom part of the glass body 10 is a dielectric substance that does not shield radio waves.

Also, as shown in FIG. 11(a), a fixing plug 14 (fixing mechanism) made of a dielectric substance can be used to plug the mobile communication device 100 placed in the storage part 20 (that is, in the waveguiding space 31), so as to securely fix the mobile communication device 100 in the storage part 20 without shielding the radio waves entering through the first radio-wave transmission surface 21 or second radio-wave transmission surface 22. Also, use of the fixing plug 14 allows not only the mobile communication device 100, but also a playing card, photograph, etc., to be placed and fixed in the storage part 20.

Similarly, as shown in FIG. 11(b), a fixing stopper 16 (fixing mechanism) made of a dielectric substance may be used to fix the mobile communication device 100 that has been placed in the storage part 20 (that is, in the waveguiding space 31). Furthermore, when hard urethane, rubber, cork material (dry) or other flexible material is adopted as the material for the fixing stopper 16, the mobile communication device 100 can be fixed simply by pushing it in the horizontal direction into the storage part 20 from the insertion opening 40, resulting in a greater convenience of removing and installing the mobile communication device 100 out of/into the glass body 10.

The method for determining the size of the first radio-wave transmission surface 21 and second radio-wave transmission surface 22 providing an entrance for radio waves into the drinking dramatization glass 1 proposed by the present invention, and of the cross-section of the waveguiding space 31 being a path for radio waves, is explained. Since the storage part 20 is basically the same as any normal waveguide tube, except that it utilizes a drink, it is most appropriate to apply an existing method for determining the cross-section size of a waveguide tube. As shown in FIG. 13, when the length of the longest side among the sides that constitute the cross-section (this cross-section is considered identical to the shape of the first radio-wave transmission surface 21 and second radio-wave transmission surface 22) of the waveguiding space 31 inside the storage part 20 is given by a [m], and a desired wavelength of radio waves to be transmitted by the waveguide tube is given by λ [m], then a [m] must always exceed the length of λ/2; otherwise, radio waves of this wavelength λ [m] cannot be transmitted. When this principle is applied to the waveguiding space 31, the size of the cross-section of the waveguiding space 31 (that is, of the first radio-wave transmission surface 21 and second radio-wave transmission surface 22) can be determined.

Specific steps are as follows: assuming that the shape of the columnar cross-section of the waveguiding space 31 is designed as rectangular (equiangular quadrilateral), while the length of the long side of the rectangle is given by a [m] and the length of the short side of the rectangle is given by b [m], as shown in FIG. 13, first a desired frequency [Hz] of radio waves to be passed through the waveguiding space 31 (referred to as "waveguide tube cutoff frequency") is predetermined, and then the speed of light [m/s] (8th power of 2.998×10 [m/s] or 8th power of 3.0×10 [m/s]) is divided by the aforementioned frequency [Hz] to obtain the wavelength $\lambda$ [m] of the radio waves, and lastly a [m]=$\lambda$/2 and b [m]=a/2 are solved. In an example of calculating, using this method, the size of the columnar cross-section of the waveguiding space 31 when wireless radio waves for a 2.4 [GHz] wireless LAN are to be transmitted, for example, the cross-section size is calculated as a rectangle of approx. 6.2 [cm]×approx. 3.1 [cm], from Formula 4 and Formula 5 in FIG. 13. (By comparison, it will be a rectangle of double the size, or 12.4 [cm]×6.2 [cm], at 1.2 [GHz].) In reality, however, the theoretical values (or, strictly speaking, approximate values) obtained by the aforementioned method may deviate from the actual values due to the effects of the design shape of the glass body 10, type of drink, etc., and, to be certain, therefore, the length of each side of the cross-section size obtained above should be increased by a length of approx. several millimeters to one centimeter, or by approx. one to three times the skin depth of the drink in the glass body 10, as a margin of error. It should be noted that, even when the columnar cross-section is shaped as a circle, oval, etc., the cross-section size can be basically determined using the values obtained by the same known method as mentioned above, and if necessary, by adding a margin of error. For other cross-section shapes, using mathematical formulas to analytically determine numerical values according to the aforementioned method is difficult, and therefore the cross-section size should be determined by utilizing the aforementioned method with a certain degree of analogy, or obtained by computer-aided numerical analysis using the FDTD (finite-difference time-domain), FEM (finite element method) or other electromagnetic field simulation method. It should be noted that, for details on these electromagnetic field simulation methods, it is advised to refer to technical books on radio wave engineering or electromagnetic field analysis, because they are not directly related to the explanations of the present invention.

If the bottom part or bottom face of the glass body 10 is also made of glass, acrylic, or other dielectric substance, placing the storage part 20 (waveguiding space 31) in contact (or forming it as one piece) with the bottom part of the glass body 10 allows for transmission of radio waves also from the bottom part. In other words, the dielectric substance at the bottom part of the glass body 10 effectively expands the extent of the space through which to pass radio waves near the bottom of the waveguiding space 31, and therefore the dielectric substance at the bottom part can be considered a part of the waveguiding space 31, and the size of the waveguiding space 31 can be reduced accordingly and designed smaller. With a glass, etc., made of glass (dielectric substance) whose bottom part has a normal thickness of approx. 1 [cm] to 2 [cm], for example, this thickness can be subtracted from a [m] mentioned above to design the size of the waveguiding space 31 smaller.

Moreover, when a table 300 on which the glass body 10 is set down is also made of a dielectric substance, in addition to the bottom part of the glass body 10, the size of the waveguiding space 31 can be reduced further, as shown in FIG. 14. For example, consider a model with a loop antenna, sheet-shaped coil antenna, etc., placed, as the antenna 111, in the bottom of the enclosure of the mobile communication device 100; in this case, a [m] of the aforementioned cross-section size can be reduced to one-half of $\lambda$/2 [m] as mentioned above, or specifically the size can be reduced to a [m]=$\lambda$/4 [m]. As the dielectric substance constituting the bottom part of the glass, and the dielectric substance contacting the bottom part of the glass (air or the table 300 made of a dielectric substance), serve as a path (or escape route) for radio waves to make up for the space corresponding to the remaining $\lambda$/4 [m], a [m] effectively becomes $\lambda$/2 [m] and the antenna 111 can (albeit in theory) transmit and receive radio waves. However, a [m] is affected by the shape or thickness of the glass or table or various other parameters, in addition to the position, shape or angle of the antenna, and, to be certain, therefore, the required minimum a [m] that permits communication should be determined by measurement or computer-aided numerical analysis. If, on the other hand, the storage part 20 (waveguiding space 31) is provided near the top opening 11 of the glass body 10, radio waves will also enter through the air (dielectric substance) near the top opening 11, and therefore the cross-section size of the waveguiding space 31 can be designed smaller by the corresponding degree (that is, it can be designed by considering the air near the top opening 11 as part of the waveguiding space 31). If the antenna 111 is placed near the top of the mobile communication device 100, for example, the antenna 111 can, albeit in theory, transmit and receive radio waves even after the aforementioned a [m] is reduced to as small as a [m]=$\lambda$/4. However, a [m] is affected by the shape or material of the glass or mobile enclosure or various other parameters, in addition to the position or angle of the antenna, and, to be certain, therefore, the required minimum a [m] that permits communication should be determined by measurement or computer-aided numerical analysis Radio waves output from the mobile communication device 100 pass through the storage part 20 (waveguiding space 31), travel through the second radio-wave transmission surface 22 and first radio-wave transmission surface 21 to reach the exterior of the glass body 10, and then reach other mobile communication device 100 via the communication line A. Also, radio waves output from other mobile communication device 100 travel over the communication line A to enter the glass body 10 through the first radio-wave transmission surface 21 and second radio-wave transmission surface 22, pass through the interior of the storage part 20 (waveguiding space 31), and reach the mobile communication device 100.

Radio waves may be not only of the frequencies in 800 [MHz] to 2 [GHz] ranges that are exclusively used for communication between mobile base stations and mobile communication devices 100, but also in frequency ranges near 2.4 [GHz] used for wireless LANs or 5 [GHz] used for high-speed wireless LANs, etc. The mobile communication device 100 as stored in the storage part 20 can communicate via a base station, via a wireless LAN router, or over the Internet (communication line A).

Then, use of the drinking dramatization glass 1 having this storage part 20 as proposed by the present invention allows for utilization, for example, of a system that displays images, movies, and other image content provided over the Internet (communication line A) on the image display part 101 of the mobile communication device 100 even when the glass body is filled with a drink, or uploads and monitors in real time the data in the mobile communication device 100 over the Internet (communication line A) using a remote server computer, or a system that receives wireless GPS signals transmitted from satellites (normally GPSs use [GHz]-band radio waves).

[Second Embodiment of Drinking Dramatization Glass]

The second embodiment of the drinking dramatization glass proposed by the present invention is explained below using drawings; it should be noted, however, that locations constitutionally identical to those in the drinking dramatization glass 1 in the aforementioned first embodiment are denoted with the same symbols and not explained.

As shown in FIG. 15 and FIG. 16, the storage part 20 may be made to stand alone from the glass body 10 so that the storage part 20 can be removed through the top opening 11. This allows the storage part 20 to be removed, as shown in FIG. 15, when the drinking dramatization glass 1 proposed by the present invention is to be used as a normal drinking glass, in order to increase the capacity (volumetric capacity) of the glass body 10 by the volumetric capacity of the storage part 20 so that more drink can be poured into the glass body 10.

Also, as shown in FIG. 16, a glass whose side face is made of a transparent dielectric material that lets radio waves pass through (such as a glass entirely made of glass, for example) can be used as the glass body 10 to allow arbitrary areas on the side face of the glass body 10 to function as the transparent part 12 and the first radio-wave transmission surface 21. This way, the storage part 20 can be fixed in a manner facing an arbitrary interior face of the glass body 10, or put differently, with the image display part 101 of the mobile communication device 100 oriented in any direction, which makes the orientation and position of the image display part 101 of the drinking dramatization glass 1 adjustable according to the user's preference or how the glass is used.

It should be noted that, when installing the storage part 20 in the glass body 10, the shape (i.e., curvature) of the first radio-wave transmission surface 21 should be matched with that of the second radio-wave transmission surface 22 to allow the first radio-wave transmission surface 21 and the second radio-wave transmission surface 22 to be in close contact with each other, or specifically, to allow the first radio-wave transmission surface 21 and the second radio-wave transmission surface 22 to be placed at a close-enough distance from each other so that radio waves can pass through even in a condition where a drink is present between them. It should be noted that the storage part fixing mechanism 35 for fixing the storage part 20 to the glass body 10 could conceivably include screws, clamps, etc. As shown in FIG. 15 and FIG. 16, a waterproof plug 41 is used, if an insertion opening 40 is provided at the top of the storage part 20, to plug or seal the insertion opening 40 so that the storage part 20 can be removed through the top opening 11 even in a condition where a drink is filled in the glass body 10.

[Third Embodiment of Drinking Dramatization Glass]

The third embodiment of the drinking dramatization glass proposed by the present invention is explained below using drawings; it should be noted, however, that locations constitutionally identical to those in the drinking dramatization glass 1 in each of the aforementioned embodiments are denoted with the same symbols and not explained.

A majority of models of mobile phones, smartphones, and other mobile communication terminals have a built-in acceleration sensor. An acceleration sensor allows for acquisition of the amount of movement or tilting of the object into which the acceleration sensor is built, and whether or not the object has hit another object. With the drinking dramatization glass in this embodiment, a user operation-detection part 106 to monitor the values of sensor-acquired data 160 of an acceleration sensor 105 in the mobile communication device 100 is provided, as shown in FIG. 17, to detect a user operation of moving or tilting the glass body 10 or clinking it against another object. Then, at the timing of detecting the user operation, an operation-detection signal 161 or sensor-acquired data 160 is transmitted, via the wireless communication part 110, to an external mobile communication device 202, remote server computer 203, etc. It should be noted that the algorithm for detecting whether or not a user operation has been performed could conceivably be the simplest algorithm of detecting a moving operation, tilting operation or clinking against another object based on whether or not the pre-determined threshold of acceleration generated by such operation has been exceeded; however, other detection algorithms may be used to detect user operations. Also, the user operation-detection part 106 may be installed in the internal control computer 200 (control part) of the mobile communication device 100 as software, or built into the interior of the mobile communication device 100 as a dedicated IC.

Controlling the image or sound currently output to the external mobile communication device 202 according to an operation of moving or tilting the glass body 10, or monitoring and tallying operations of clinking the glass body 10 against another object (toasting operation) using the remote server computer 203 and then publishing the count to the world in real time, will become possible. It should be noted that, at the timing of detecting a user operation, an image near the glass body 10 may be captured using the camera 104 in the mobile communication device 100 so that it can be transmitted together with an operation-detection signal 161 or sensor-acquired data 160.

Also, by vibrating a vibrator 130 (commonly known as vibrator) in the mobile communication device 100 at the timing of transmitting an operation-detection signal 161 or sensor-acquired data 160, the user can be notified of the transmission of operation-detection signal 161 or sensor-acquired data 160.

As shown in FIG. 18, when data has been transmitted or received via the wireless communication part 110, the vibrator 130 in the mobile communication device 100 can be vibrated at this timing to notify the user of the transmission or reception of data by the mobile communication device 100 inside the glass body 10.

If a fizzy carbonated drink is filled in the glass body 10, specific data can be transmitted to the mobile communication device 100 inside the glass body 10 from an external mobile communication device 202 or remote server computer 203, to vibrate the vibrator 130 inside that mobile communication device 100 and thereby generate bubbles in the carbonated drink inside the glass body 10. In other words, generation of bubbles in the carbonated drink inside the glass body 10 in a remote location can be controlled from the mobile communication device 202, remote server computer 203, etc.

[Embodiment of Remote Toast Counter System]

An embodiment of the remote toast counter system proposed by the present invention is explained below.

As explained in the third embodiment of drinking dramatization glass, the drinking dramatization glass proposed by the present invention can detect a user operation of moving or tilting the glass body 10 or clinking it against another object, using the acceleration sensor 105 in the mobile communication device 100, and transmit to a remote server computer 203, etc. As shown in FIG. 19, the acceleration sensor transmits a toast detection signal to the control part when the user performs a toasting action using the drinking dramatization glass, and the control part, after receiving the toast detection signal, transmits an output signal to an external server computer via the wireless communication part. The server computer 203 has been counting the number of times a toast detection signal is received and recording the count as a cumulative number of toasting operations, and the user can view the cumulative number of toasting operations.

INDUSTRIAL FIELD OF APPLICATION

The present invention relates to a drinking dramatization glass, and a remote toast counter system, both designed to let an individual enjoy oneself alone or together with others in remote locations, and also to present many different dramatizing effects, and therefore has industrial applicability.

DESCRIPTION OF THE SYMBOLS

A Communication line
G Radio wave of GPS signal
U User
L Drink (liquid)
SD Sensor
1 Drinking dramatization glass
2 Drinking dramatization glass
3 Glass whose side face is made of a transparent dielectric substance
4 Normal drinking glass
10 Glass body
11 Top opening
12 Transparent part
13 Handle
14 Fixing plug (fixing mechanism)
15 Lid
16 Fixing stopper
20 Storage part
21 First radio-wave transmission surface
22 Second radio-wave transmission surface
25 Storage part
31 Waveguiding space
32 Dielectric substance
33 Conductor part
34 Metal layer
35 Storage part fixing mechanism
40 Insertion opening
41 Waterproof plug
50 User's hand
100 Mobile communication device
101 Image display part
102 Voice output part
103 Microphone (sound sensor)
104 Camera (camera sensor)
105 Acceleration sensor
106 User operation-detection part
110 Wireless communication part
111 Antenna
130 Vibrator
150 Image content
151 Voice content
160 Sensor-acquired data
161 Operation-detection signal
162 Vibrator control signal
200 Internal computer (control part)
201 Personal computer
202 External mobile communication device
203 Server computer
300 Table (dielectric substance)

What is claimed is:

1. A drinking dramatization glass, comprising:
 a glass body being a bottomed cylinder with a top opening;
 a storage part for storing a communication device having an image display part that displays images, a wireless communication part equipped with an antenna, a voice output part that outputs voices, and a control part that controls the image display part, the wireless communication part, and the voice output part; and
 a transparent part through which to view, from an exterior, images displayed on the image display part;
 characterized in that:
 a first radio-wave transmission surface, made of a dielectric substance capable of letting radio waves pass through, is formed on a side face of the glass body;
 the storage part is placed inside the glass body, where a dielectric substance capable of letting radio waves pass through is filled inside the storage part, and a second radio-wave transmission surface, made of a dielectric substance capable of letting radio waves pass through, is formed on a side face of the storage part;
 the first radio-wave transmission surface and the second radio-wave transmission surface are placed at a close-enough distance from each other so that they can let radio waves pass through in a condition where a drink is present between them; and
 the storage part manifests, when a periphery thereof is surrounded by a drink, a waveguiding function of letting radio waves pass through an interior thereof, p1 wherein the communication device is a mobile communication device storing the image display part, the wireless communication part, the voice output part, and the control part in a single enclosure; and
 the storage part has an insertion opening through which to insert the communication device into the storage part.

2. The drinking dramatization glass according to claim 1, characterized in that a part or all of the transparent part is a lens, so that the image display part of the communication device as stored in the storage part can be magnified for viewing from an exterior of the glass body.

3. The drinking dramatization glass according to claim 1, characterized in that:
 it has a fixing mechanism for fixing the communication device in place inside the storage part; and
 the fixing mechanism is made of a dielectric substance capable of letting radio waves pass through.

4. The drinking dramatization glass according to claim 1, characterized in that the insertion opening is formed in a manner penetrating through the first radio-wave transmission surface and second radio-wave transmission surface.

5. The drinking dramatization glass according to claim 1, characterized in that the glass body and the storage part are made of a flexible material, and the communication device in the storage part can be operated by applying an external force and thereby deforming the glass body and the storage part.

6. The drinking dramatization glass according to claim 1, characterized by having a lid for closing off the top opening.

7. The drinking dramatization glass according to claim 1, characterized in that the communication device has an acceleration sensor and, when the user moves or tilts the glass body or clinks it against an other object, the acceleration sensor transmits an operation-detection signal to the control part, and the control part, after receiving the operation-detection signal, transmits an output signal to an exterior via the wireless communication part.

8. The drinking dramatization glass according to claim 7, characterized in that the communication device has a camera and, upon receiving the operation-detection signal, the control part drives the camera to capture an image and transmits captured image data to an exterior via the wireless communication part.

9. A remote toast counter system, comprising two or more drinking dramatization glasses according to claim 7, characterized in that:
when the user uses any of the drinking dramatization glasses to perform a toasting action, the acceleration sensor transmits a toast detection signal to the control part, and the control part, after receiving the toast detection signal, transmits an output signal to an external server computer via the wireless communication part, wherein the server computer counts a number of times the toast detection signal is received and recording such count as a cumulative number of toasting operations, and the user can view the cumulative number of toasting operations.

10. The drinking dramatization glass according to claim 1, characterized in that the communication device has a vibrator and, at a timing of radio wave communication initiated by the communication device, the vibrator vibrates and the glass body vibrates as a result.

11. The drinking dramatization glass according to claim 1, characterized in that the storage part is removable from the glass body.

12. The drinking dramatization glass according to claim 11, characterized by having a storage part fixing mechanism for fixing the storage part to the glass body.

13. The drinking dramatization glass according to claim 11, characterized in that:
a side face of the glass body is constituted by a transparent dielectric substance capable of letting radio waves pass through, to cause an entire side face of the glass body to function as the transparent part and the first radio-wave transmission surface;
whereby an orientation of the storage part in the glass body is made changeable.

14. A drinking dramatization glass, comprising:
a glass body being a bottomed cylinder with a top opening;
a storage part for storing a communication device having an image display part that displays images, a wireless communication part equipped with an antenna, a voice output part that outputs voices, and a control part that controls the image display part, the wireless communication part, and the voice output part; and
a transparent part through which to view, from an exterior, images displayed on the image display part;
characterized in that:
a first radio-wave transmission surface, made of a dielectric substance capable of letting radio waves pass through, is formed on a side face of the glass body;
the storage part is placed inside the glass body, where a dielectric substance capable of letting radio waves pass through is filled inside the storage part, and a second radio-wave transmission surface, made of a dielectric substance capable of letting radio waves pass through, is formed on a side face of the storage part;
the first radio-wave transmission surface and the second radio-wave transmission surface are placed at a close-enough distance from each other so that they can let radio waves pass through in a condition where a drink is present between them; and
the storage part manifests, when a periphery thereof is surrounded by a drink, a waveguiding function of letting radio waves pass through an interior thereof,
wherein the first radio-wave transmission surface and second radio-wave transmission surface are both a polygon, and a length of a longest side, among sides constituting the polygon, is longer than one-half a wavelength of the radio waves.

15. A drinking dramatization glass, comprising:
a glass body being a bottomed cylinder with a top opening;
a storage part for storing a communication device having an image display part that displays images, a wireless communication part equipped with an antenna, a voice output part that outputs voices, and a control part that controls the image display part, the wireless communication part, and the voice output part; and
a transparent part through which to view, from an exterior, images displayed on the image display part;
characterized in that:
a first radio-wave transmission surface, made of a dielectric substance capable of letting radio waves pass through, is formed on a side face of the glass body;
the storage part is placed inside the glass body, where a dielectric substance capable of letting radio waves pass through is filled inside the storage part, and a second radio-wave transmission surface, made of a dielectric substance capable of letting radio waves pass through, is formed on a side face of the storage part;
the first radio-wave transmission surface and the second radio-wave transmission surface are placed at a close-enough distance from each other so that they can let radio waves pass through in a condition where a drink is present between them; and
the storage part manifests, when a periphery thereof is surrounded by a drink, a waveguiding function of letting radio waves pass through an interior thereof,
wherein air is filled inside the storage part as the dielectric substance; and
there is neither the first radio-wave transmission surface nor the second radio-wave transmission surface, and a through hole is provided instead that continues from a side face of the glass body to an interior of the storage part.

* * * * *

UNITED STATES PATENT AND TRADEMARK OFFICE
CERTIFICATE OF CORRECTION

PATENT NO. : 10,966,555 B2
APPLICATION NO. : 16/976450
DATED : April 6, 2021
INVENTOR(S) : Makoto Nishida Page 1 of 1

It is certified that error appears in the above-identified patent and that said Letters Patent is hereby corrected as shown below:

In the Claims

Column 20, Line 32, Claim 1, the term "p1" between "thereof," and "wherein" should be deleted.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*